United States Patent
Kuang et al.

(10) Patent No.: US 12,250,716 B2
(45) Date of Patent: Mar. 11, 2025

(54) USER EQUIPMENT AND BASE STATION PERFORMING TRANSMISSION AND RECEPTION OPERATIONS

(71) Applicant: Panasonic Intellectual Property Corporation of America, Torrance, CA (US)

(72) Inventors: Quan Kuang, Langen (DE); Hidetoshi Suzuki, Kanagawa (JP); Hongchao Li, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 376 days.

(21) Appl. No.: 17/618,403

(22) PCT Filed: Jul. 23, 2020

(86) PCT No.: PCT/EP2020/070778
§ 371 (c)(1),
(2) Date: Dec. 10, 2021

(87) PCT Pub. No.: WO2021/023518
PCT Pub. Date: Nov. 11, 2021

(65) Prior Publication Data
US 2022/0312478 A1  Sep. 29, 2022

(30) Foreign Application Priority Data
Aug. 2, 2019 (EP) ..................... 19189920

(51) Int. Cl.
*H04W 74/08* (2024.01)
*H04W 16/14* (2009.01)
(Continued)

(52) U.S. Cl.
CPC ....... *H04W 74/0808* (2013.01); *H04W 16/14* (2013.01); *H04W 74/0833* (2013.01)

(58) Field of Classification Search
CPC ............. H04W 16/14; H04W 74/0808; H04W 74/0833
See application file for complete search history.

(56) References Cited

U.S. PATENT DOCUMENTS

2020/0045738 A1\* 2/2020 Oh ........................ H04W 72/23
2021/0307072 A1\* 9/2021 Kusashima ....... H04W 74/0808
(Continued)

OTHER PUBLICATIONS

3GPP, "3rd Generation Partnership Project; Technical Specification Group Radio Access Network; NR; Medium Access Control (MAC) protocol specification (Release 15)," 3GPP TS 38.321 V15.6.0, Jun. 2019. (78 pages).

(Continued)

*Primary Examiner* — Awet Haile
(74) *Attorney, Agent, or Firm* — Seed IP Law Group LLP

(57) ABSTRACT

The present disclosure relates to a user equipment (UE) and base station (BS) involved in an improved physical random access channel, PRACH, transmission. The UE configures, based on a received unlicensed channel access configuration, symbols of an occupancy time of the respective unlicensed channel for uplink communication; receives an indication of a timing of channel resources which are to be used for a PRACH transmission; determines whether or not the indicated timing of channel resources is included within the symbols configured for uplink communication; if successful, performs a clear channel assessment, CCA, for a gap duration before the start of the indicated timing of channel resources which are to be used for the PRACH transmission; and if successful, transmits a random access, RA, preamble within the symbols configured for uplink communication at (Continued)

the indicated timing of channel resources which are to be used for the PRACH transmission.

12 Claims, 12 Drawing Sheets

(51) Int. Cl.
    *H04W 74/0808* (2024.01)
    *H04W 74/0833* (2024.01)

(56) References Cited

U.S. PATENT DOCUMENTS

| | | | | |
|---|---|---|---|---|
| 2022/0167423 A1* | 5/2022 | Aldana | ............... | H04W 74/004 |
| 2022/0191936 A1* | 6/2022 | Shin | ................. | H04W 74/0833 |
| 2022/0191944 A1* | 6/2022 | Reial | ................... | H04W 74/008 |

OTHER PUBLICATIONS

3GPP, "3rd Generation Partnership Project; Technical Specification Group Radio Access Network; NR; Physical layer procedures for control (Release 15)," 3GPP TS 38.213 V15.6.0, Jun. 2019. (107 pages).

3GPP, "3rd Generation Partnership Project; Technical Specification Group Radio Access Network; NR; Base Station (BS) radio transmission and reception (Release 16)" 3GPP TS 38.104 V16.0.0, Jun. 2019. (228 pages).

3GPP, "3$^{rd}$ Generation Partnership Project; Technical Specification Group Radio Access Network;. NR; NR and NG-RAN Overall Description; Stage 2 (Release 15)," 3GPP TS 38.300 V15.6.0, Jun. 2019. (99 pages).

3GPP, "3$^{rd}$ Generation Partnership Project; Technical Specification Group Radio Access Network; NR; Physical channels and modulation (Release 15)," 3GPP TS 38.211 V15.6.0, Jun. 2019. (97 pages).

3GPP, "3$^{rd}$ Generation Partnership Project; Technical Specification Group Radio Access Network; NR; Radio Resource Control (RRC) protocol specification (Release 15)," 3GPP TS 38.331 V15.6.0, Jun. 2019. (519 pages).

3GPP, "3$^{rd}$ Generation Partnership Project; Technical Specification Group Radio Access Network; Study on new radio access technology; Radio access architecture and interfaces (Release 14)," 3GPP TR 38.801 V14.0.0, Mar. 2017. (91 pages).

3GPP, "3$^{rd}$ Generation Partnership Project; Technical Specification Group Radio Access Network; Study on NR-based access to unlicensed spectrum (Release 16)," 3GPP TR 38.889 V16.0.0, Dec. 2018. (119 pages).

3GPP, "3$^{rd}$ Generation Partnership Project; Technical Specification Group Radio Access Network; Study on Scenarios and Requirements for Next Generation Access Technologies; (Release 15)," 3GPP TR 38.913 V15.0.0, Jun. 2018. (39 pages).

3GPP, "3$^{rd}$ Generation Partnership Project; Technical Specification Group Services and System Aspects; System Architecture for the 5G System; Stage 2 (Release 16)," 3GPP TS 23.501 V16.1.0, Jun. 2019. (368 pages).

ETSI EN 301 893 V2.1.1, "5 GHz RLAN; Harmonised Standard covering the essential requirements of article 3.2 of Directive 2014/53/EU" May 2017, 122 pages.

Extended European Search Report, dated Jan. 31, 2020, for European Application No. 19189920.2-1215. (10 pages).

International Search Report, mailed Aug. 14, 2020, for International Application No. PCT/EP2020/070778. (2 pages).

Nokia, Nokia Shanghai Bell, "Feature Lead's Summary on Channel Access Procedures," R1-1813994, Agenda Item: 7.2.2.4.1, 3GPP TSG RAN WG1#95, Spokane, US, Nov. 12-16, 2018. (22 pages).

NTT Docomo, Inc., "Discussion on PRACH for eLAA UL," R1-160950, Agenda Item: 7.3.1.4, 3GPP TSG RAN WG1 Meeting #84, St Julian's, Malta, Feb. 15-19, 2016. (6 pages).

Samsung, "Channel access procedures for NR-U," R1-1906920, Agenda Item: 7.2.2.2.1, 3GPP TSG-RAN WG1 Meeting #97, Reno, USA, May 13-17, 2019. (12 pages).

\* cited by examiner

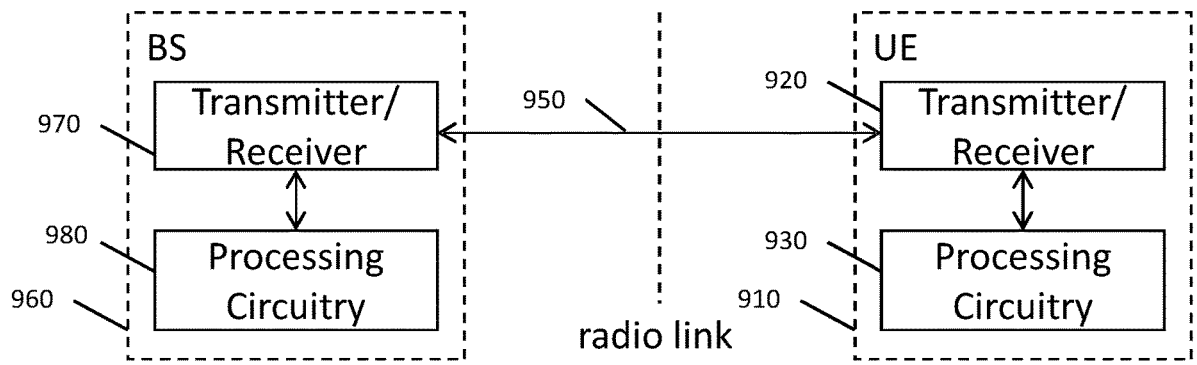
Fig. 9
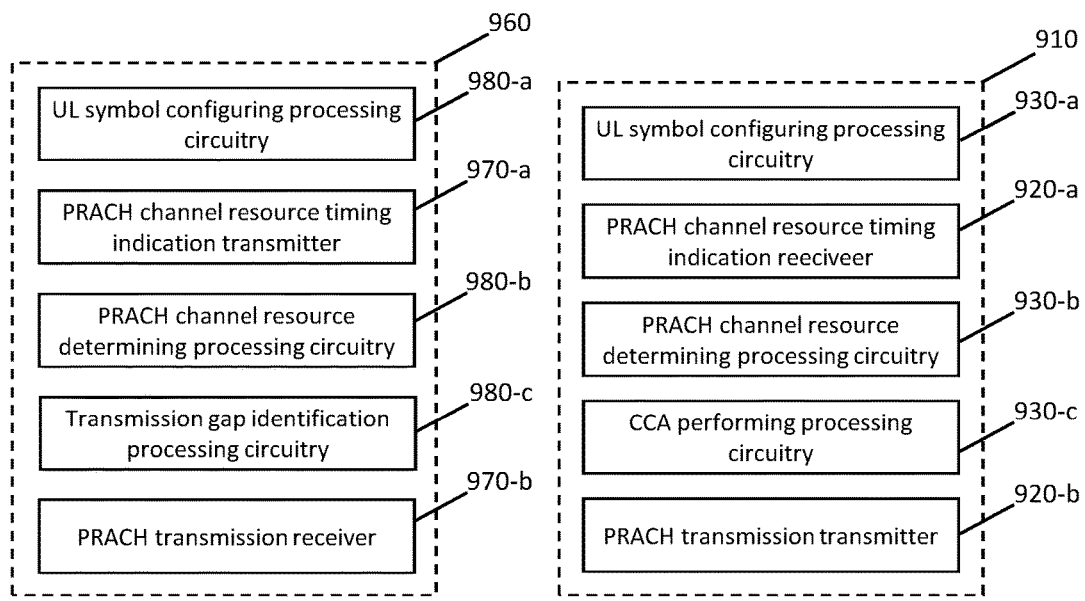
Fig. 10
Fig. 11

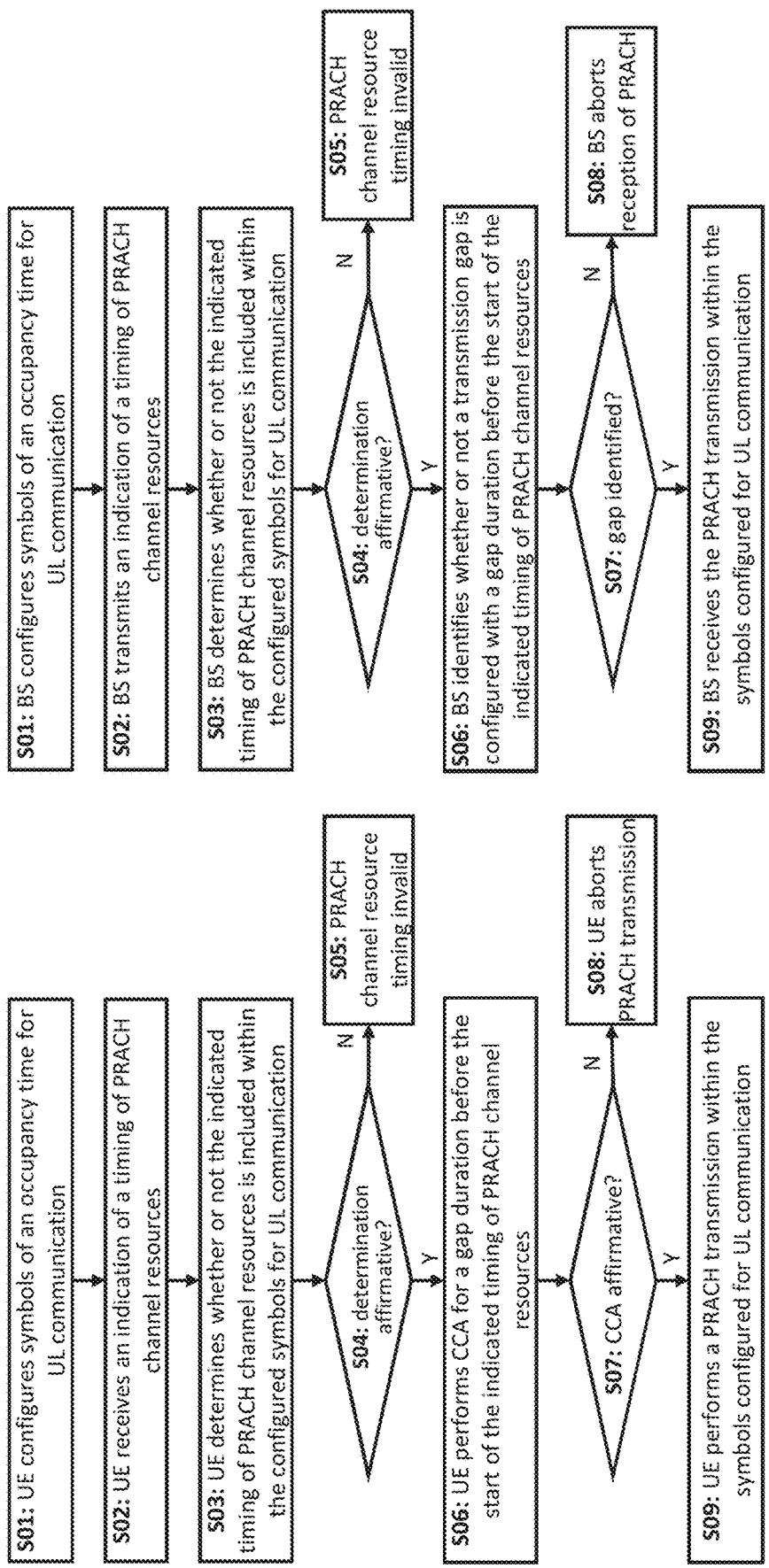

USER EQUIPMENT AND BASE STATION PERFORMING TRANSMISSION AND RECEPTION OPERATIONS

BACKGROUND

Technical Field

The present disclosure is directed to methods, devices and articles in communication systems, such as 3GPP communication systems.

Description of the Related Art

Currently, the 3rd Generation Partnership Project (3GPP) works at the technical specifications for the next generation cellular technology, which is also called fifth generation (5G).

One objective is to provide a single technical framework addressing all usage scenarios, requirements and deployment scenarios (see, e.g., section 6 of TR 38.913 version 15.0.0), at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC deployment scenarios may include scenarios with large number of devices with non-time critical data transfers such as smart wearables and sensor networks. The services eMBB and URLLC are similar in that they both demand a very broad bandwidth, however are different in that the URLLC service may preferably require ultra-low latencies.

A second objective is to achieve forward compatibility. Backward compatibility to Long Term Evolution (LTE, LTE-A) cellular systems is not required, which facilitates a completely new system design and/or the introduction of novel features.

BRIEF SUMMARY

One non-limiting and exemplary embodiment facilitates providing improved procedures for performing PRACH transmissions over an unlicensed channel, namely for performing PRACH transmissions within an occupation time of the unlicensed channel.

In an embodiment, the techniques disclosed here feature a user equipment, UE, is provided comprising a processor, a receiver and a transmitter. The processor, in operation, configures, based on a received unlicensed channel access configuration, at least one symbol of an occupancy time of the respective unlicensed channel for uplink communication. The receiver, in operation, receives an indication of a timing of channel resources which are to be used for a physical random access channel, PRACH, transmission. The processor, in operation, determines whether or not the indicated timing of channel resources which are to be used for the PRACH transmission is included within the at least one symbol configured for uplink communication. The processor, in operation and in case the determination is affirmative, performs a clear channel assessment, CCA, for a gap duration before the start of the indicated timing of channel resources which are to be used for the PRACH transmission. And, the transmitter, in operation and in case the CCA is affirmative, performs the PRACH transmission by transmitting a random access, RA, preamble within the at least one symbol configured for uplink communication at the indicated timing of channel resources which are to be used for the PRACH transmission.

It should be noted that general or specific embodiments may be implemented as a system, a method, an integrated circuit, a computer program, a storage medium, or any selective combination thereof.

Additional benefits and advantages of the disclosed embodiments and different implementations will be apparent from the specification and figures. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings.

FIG. 9 illustrates an exemplary and simplified structure of a UE and a gNB;

FIGS. 10, 11 show exemplary and simplified structures of the gNB and UE, respectively, according to a generic scenario of an improved PRACH transmission operation;

FIGS. 12, 13 depict flow diagrams for the behavior of a UE and gNB, respectively, according to the generic scenario of an improved PRACH transmission operation.

DETAILED DESCRIPTION

5G NR System Architecture and Protocol Stacks

The 3rd generation partnership project (3GPP) has been working at the next release for the $5^{th}$ generation cellular technology, simply called 5G, including the development of a new radio access technology (NR) operating at frequencies ranging up to 100 GHz. The first version of the 5G standard was completed at the end of 2017, which allows proceeding to 5G NR standard-compliant trials and commercial deployments of smartphones.

Among other things, the overall system architecture assumes an NG-RAN (Next Generation-Radio Access Network) that comprises gNBs, providing the NG-radio access user plane (SDAP/PDCP/RLC/MAC/PHY) and control plane (RRC) protocol terminations towards the UE.

The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface.

Figure 1:
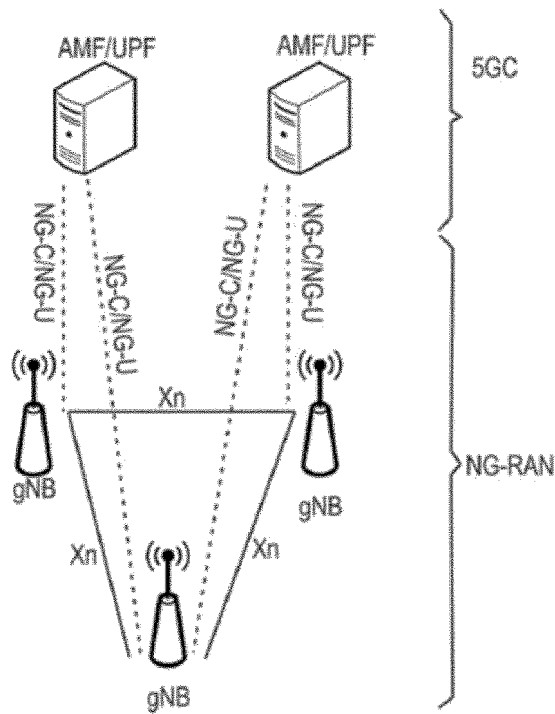
FIG. 1 shows an exemplary architecture for a 3GPP 5G system including 5G Core network (5GC) and Next Generation Radio Access Network (NG-RAN)

FIG. 1 illustrates the NG-RAN architecture (see, e.g., 3GPP TS 38.300 v15.6.0, section 4).

Various different deployment scenarios can be supported (see, e.g., 3GPP TR 38.801 v14.0.0). For instance, a non-centralized deployment scenario (see, e.g., section 5.2 of TR 38.801; a centralized deployment is illustrated in section 5.4) is presented therein, where base stations supporting the 5G NR can be deployed.

Figure 2:
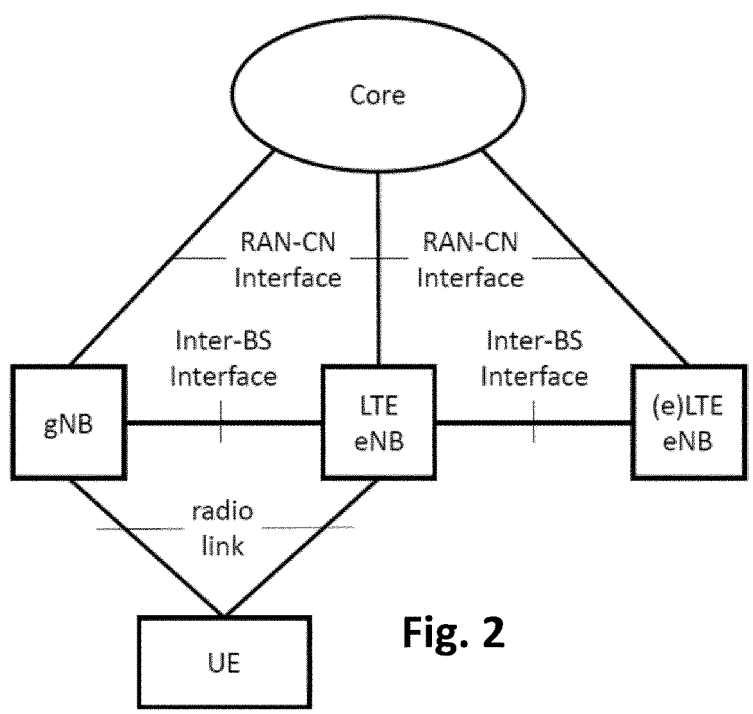
FIG. 2 depict an exemplary non-centralized deployment scenario where a 5G system with a gNB, is deployed alongside an LTE system with a eNB, FIG. 3 schematically illustrates a functional split between the functionalities provided by Next Generation Radio Access Network (NG-RAN) and 5G Core network (5GC)

FIG. 2 illustrates an exemplary non-centralized deployment scenario (see, e.g., FIG. 5.2.-1 of said TR 38.801), while additionally illustrating an LTE eNB as well as a user equipment (UE) that is connected to both a gNB and an LTE eNB. The new eNB for NR 5G may be exemplarily called gNB. An eLTE eNB is the evolution of an eNB that supports connectivity to the EPC (Evolved Packet Core) and the NGC (Next Generation Core).

The user plane protocol stack for NR (see, e.g., 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see, e.g., sub-clause 6.5 of 3GPP TS 38.300).

A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300.

For instance, the Medium-Access-Control layer (MAC) handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels.

For transmission of transport channels, physical channels are used which correspond to a set of time-frequency resources. Each transport channel is mapped to a corresponding physical channel. One physical channel is the PRACH (Physical Random Access Channel) used for the random access.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-10$^{-5}$ within 1 ms). Finally, mMTC may preferably require high connection density (1,000,000 devices/km$^2$ in an urban environment), large coverage in harsh environments, and extremely long-life battery for low cost devices (15 years).

Therefore, OFDM numerologies (e.g., subcarrier spacing, OFDM symbol duration, cyclic prefix (CP) duration, number of symbols per scheduling interval) which are suitable for one use case might not work well for another.

For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f=1/T_u$. In a similar manner as in LTE systems, the term "resource element" can be used to denote a minimum resource unit being composed of one subcarrier for the length of one OFDM/SC-FDMA symbol.

In the new radio system 5G NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0).

5G NR Functional Split Between NG-RAN and 5GC

Figure 3:
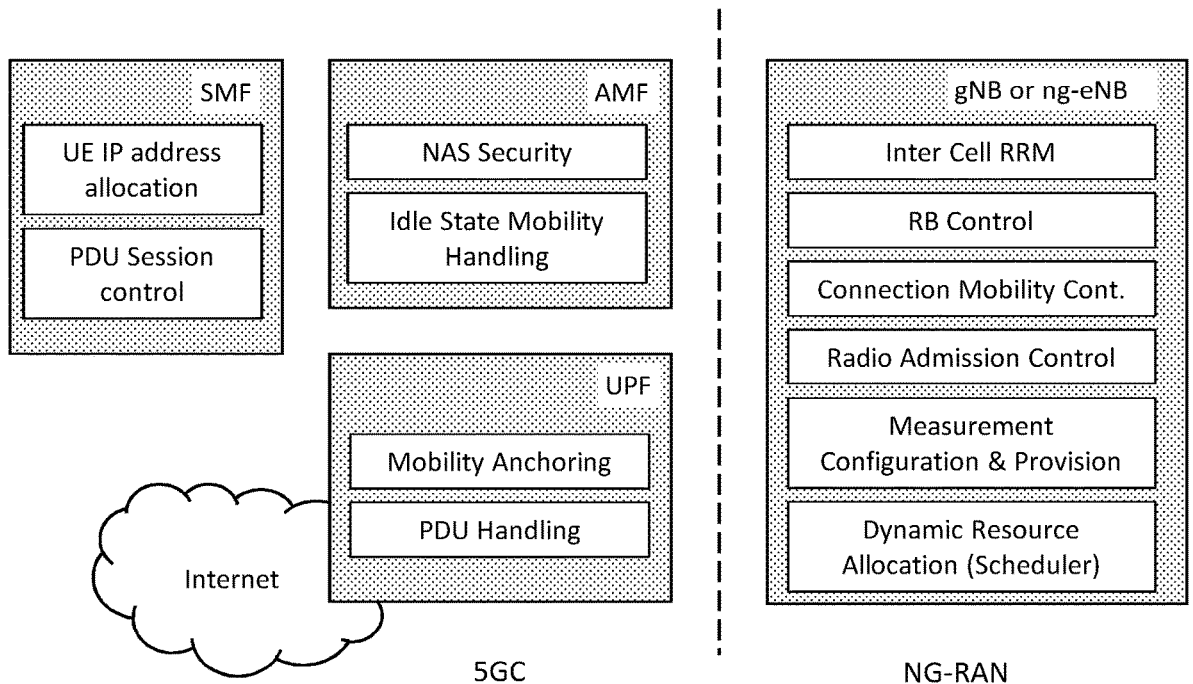

FIG. 3 illustrates functional split between NG-RAN and 5GC. A NG-RAN logical node is a gNB or ng-eNB. The 5GC has logical nodes AMF, UPF and SMF.

In particular, the gNB and ng-eNB host the following main functions:

- Functions for Radio Resource Management such as Radio Bearer Control, Radio Admission Control, Connection Mobility Control, Dynamic allocation of resources to UEs in both uplink and downlink (scheduling);
- IP header compression, encryption and integrity protection of data;
- Selection of an AMF at UE attachment when no routing to an AMF can be determined from the information provided by the UE;
- Routing of User Plane data towards UPF(s);
- Routing of Control Plane information towards AMF;
- Connection setup and release;
- Scheduling and transmission of paging messages;
- Scheduling and transmission of system broadcast information (originated from the AMF or OAM);
- Measurement and measurement reporting configuration for mobility and scheduling;
- Transport level packet marking in the uplink;
- Session Management;
- Support of Network Slicing;
- QoS Flow management and mapping to data radio bearers;
- Support of UEs in RRC_INACTIVE state;
- Distribution function for NAS messages;
- Radio access network sharing;
- Dual Connectivity;
- Tight interworking between NR and E-UTRA.

The Access and Mobility Management Function (AMF) hosts the following main functions:

- Non-Access Stratum, NAS, signaling termination;
- NAS signaling security;
- Access Stratum, AS, Security control;
- Inter Core Network, CN, node signaling for mobility between 3GPP access networks;
- Idle mode UE Reachability (including control and execution of paging retransmission);
- Registration Area management;
- Support of intra-system and inter-system mobility;
- Access Authentication;
- Access Authorization including check of roaming rights;
- Mobility management control (subscription and policies);
- Support of Network Slicing;
- Session Management Function, SMF, selection.

Furthermore, the User Plane Function, UPF, hosts the following main functions:

- Anchor point for Intra-/Inter-RAT mobility (when applicable);
- External PDU session point of interconnect to Data Network;
- Packet routing & forwarding;
- Packet inspection and User plane part of Policy rule enforcement;
- Traffic usage reporting;
- Uplink classifier to support routing traffic flows to a data network;
- Branching point to support multi-homed PDU session;
- QoS handling for user plane, e.g., packet filtering, gating, UL/DL rate enforcement;
- Uplink Traffic verification (SDF to QoS flow mapping);
- Downlink packet buffering and downlink data notification triggering.

Finally, the Session Management function, SMF, hosts the following main functions:

- Session Management;
- UE IP address allocation and management;
- Selection and control of UP function;
- Configures traffic steering at User Plane Function, UPF, to route traffic to proper destination;
- Control part of policy enforcement and QoS;
- Downlink Data Notification.

RRC Connection Setup and Reconfiguration Procedures

Figure 4:
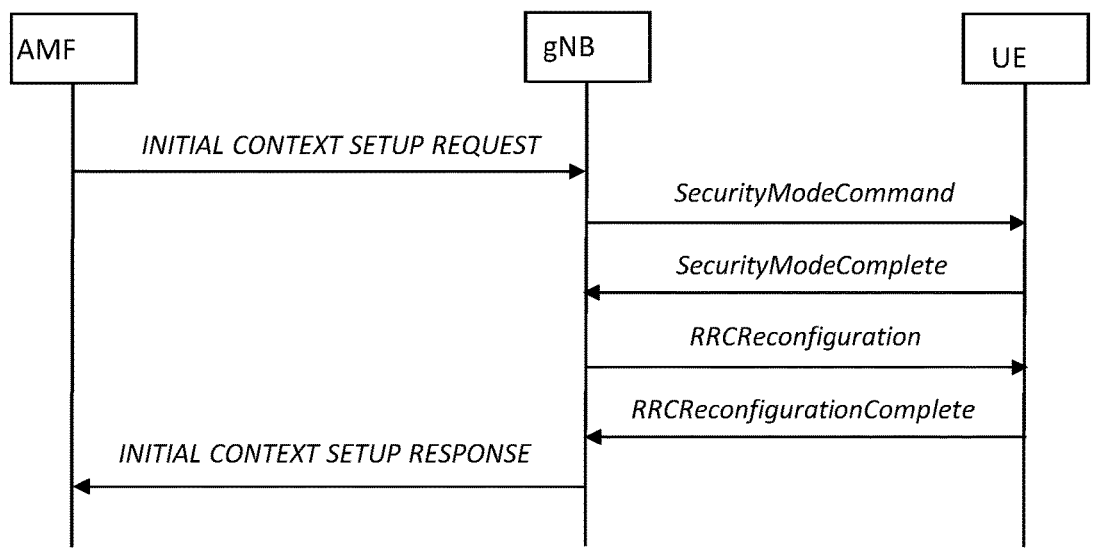
FIG. 4 shows in a sequence diagram a radio resource control, RRC, connection setup/reconfiguration procedures for a 3GPP 5G system, FIG. 5 schematically depicts usage scenarios of Enhanced mobile broadband (eMBB), Massive Machine Type Communications (mMTC) and Ultra Reliable and Low Latency Communications (URLLC), FIG. 6 exemplary illustrates in a block diagram of 3GPP's 5G service based architecture (SBA) for a non-roaming scenario.

FIG. 4 illustrates some interactions between a UE, gNB, and AMF (an 5GC entity) in the context of a transition of the UE from RRC IDLE to RRC CONNECTED for the NAS part (see TS 38.300 v15.6.0).

RRC is a higher layer signaling (protocol) used for UE and gNB configuration. In particular, this transition involves that the AMF prepares the UE context data (including, e.g., PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message.

Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

In the present disclosure, thus, an entity (for example AMF, SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element to the UE via the signaling radio bearer. The UE then performs an uplink transmission or a downlink reception based on the resource allocation configuration.

Usage Scenarios of IMT for 2020 and Beyond

Figure 5:
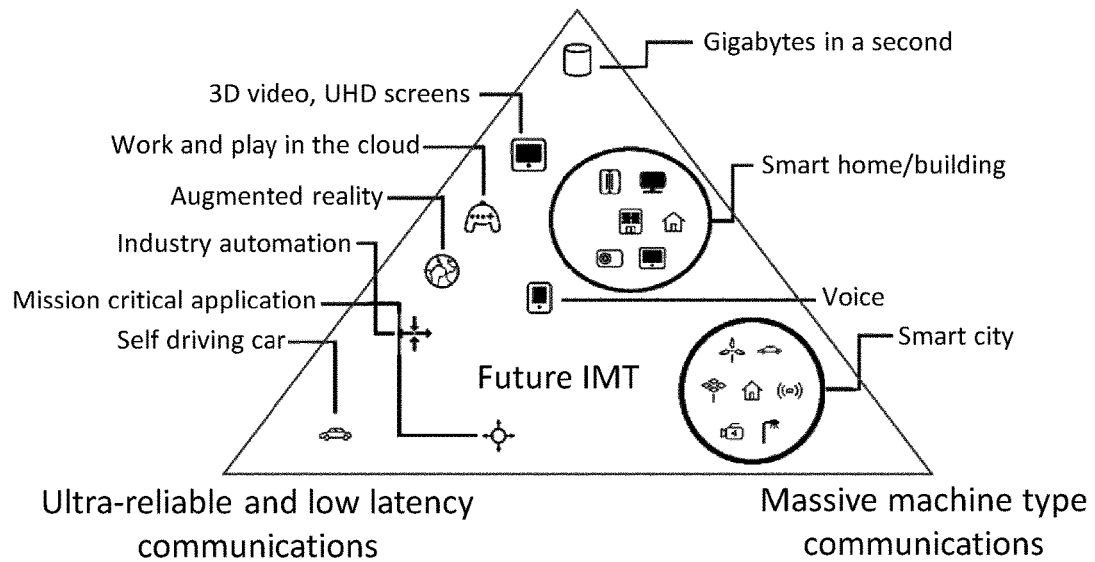

FIG. 5 illustrates some of the use cases for 5G NR. In 3GPP new radio (3GPP NR), three use cases are being considered that support a wide variety of services and applications envisaged by the initiative IMT-2020. The specification for the phase 1 of enhanced mobile-broadband (eMBB) has been concluded. In addition to further extending the eMBB support, the current and future work involves the standardization of ultra-reliable and low-latency communications (URLLC) and massive machine-type communications for 2020 and beyond.

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913.

The stringent requirements are higher reliability (up to 10-6 level), higher availability, packet sizes of up to 256 bytes, time synchronization down to the order of a few μs where the value can be one or a few μs depending on frequency range and short latency in the order of 0.5 to 1 ms in particular a target user plane latency of 0.5 ms, depending on the use cases. The general URLLC requirement for one transmission of a packet is a BLER (block error rate) of 1E-5 for a packet size of 32 bytes with a user plane latency of 1 ms.

Moreover, for NR URLLC, several technology enhancements from RAN1 perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

However, the scope may widen for achieving ultra-reliability as the NR becomes more stable and developed (for NR URLLC key requirements). Particular use cases of NR URLCC in Rel. 15 include Augmented Reality/Virtual Reality (AR/VR), e-health, e-safety, and mission-critical applications.

Moreover, technology enhancements targeted by NR URLCC aim at latency improvement and reliability improvement. Technology enhancements for latency improvement include configurable numerology, non-slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLCC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g., as shown above with reference to FIG. 4. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 6:
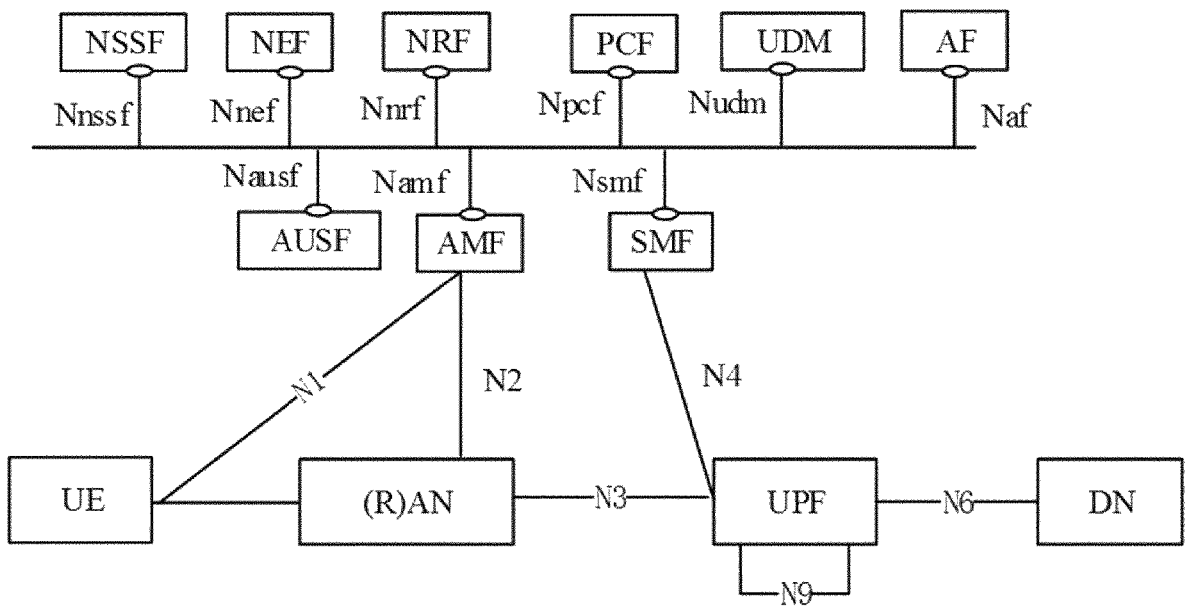

FIG. 6 illustrates a 5G NR non-roaming reference architecture (see TS 23.501 v16.1.0, section 4.23). An Application Function (AF), e.g., an external application server hosting 5G services, exemplarily described in FIG. 5, interacts with the 3GPP Core Network in order to provide services, for example to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

Further shown are functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3rd party services.

Random Access Procedure

In 5G NR, random access channel transmissions are devised for UEs to permit initial access to a cell of a NG-RAN system. Such random access transmissions are carried out in a prescribed sequence, namely according to the random access procedure. The random access channel procedure is standardized (see, e.g., 3GPP TS38.321 section 5.1, v.15.6.0) and the following description only gives a cursory overview on individual aspects.

Once a UE has found a cell it may access the cell. This can be done using the random access procedure. This procedure consists of four "steps." In a first step, the UE transmits a random access (RA) preamble (short: preamble) on the Physical Random Access Channel (PRACH) to the gNB (message 1 of the RA procedure). After the gNB has detected a RA preamble, in a second step it sends a Random Access Response (RAR) message (message 2 of the RA procedure) on the PDSCH (Physical Downlink Shared Channel). The RAR message is preceded by control information on PDCCH with the (Random Access) RA-RNTI scheduling the RAR message The RAR message conveys the detected RA preamble, a time-alignment command (TA command) for synchronization of subsequent uplink transmissions, an initial uplink resource assignment (UL grant) for a first scheduled transmission and an assignment of a Temporary Cell Radio Network Temporary Identifier (T-CRNTI). This T-CRNTI is used by gNB to address a UE until the RACH procedure is finished, since at this point the "real" identity of the UE is not yet known by the gNB.

The third and fourth steps (messages 3/4 of the RA procedure) are provided with the aim of resolving potential collisions. Such collisions occur if two UEs transmit a same RA preamble in a same PRACH resource (e.g., collision case). In this case, the gNB may either fail receiving the RA preamble due to interference between the two transmissions, or it will succeed receiving a single RA preamble. In the latter case, the gNB however cannot distinguish the two UEs. Thus, the gNB responds with a single RAR message with a single UL grant that is then receive by the two UEs.

The UE monitors the PDCCH for reception of the RAR message within the given time window (e.g., termed RAR time window), which is configured by the gNB. Using the indicated UL grant, the UE performs the first scheduled uplink transmission (message 3 of the RA procedure) on the assigned radio resources. This scheduled uplink transmission conveys an actual RRC message like, for example, a RRC Connection Request, or RRC Resume Request.

In response thereto, the gNB transmits second actual RRC message (message 4 of the RA procedure) via PDSCH which, in case of a successful RA procedure, transfers the UE to the RRC connected state. This scheduled downlink transmission is preceded by control information on PDCCH with a DL assignment scheduling the respective RRC message. For example, this can be a RRC Setup or a RRC Resume message.

Coming back to the collision case. Having received the single RAR message the two UEs will use the single UL grant from the RAR message to transmit message 3 of the RA procedure. Obviously, this will fail as the two UEs are operating with the same T-CRNTI from the RAR message. Depending on the level of interference between the two uplink transmissions, either none or at most one of the two transmissions is successfully received by the gNB. Then, conventionally known mechanisms, such as the timer expiry mechanisms (see, e.g., 3GPP TS38.331 section 7.1 v.15.6.0) enable detection of the collision and an according resolution.

Physical Random Access Channel

The Physical Random Access Channel is specified in terms of time-frequency resources, namely resources which are intended to carry RA preambles (message 1 of the RA procedure). Such resources may also be referred to as PRACH occasions. This emphasizes that the resources of the PRACH merely occasion the transmission of a RA preamble. Yet, only a small fraction of the resources is actually used for transmissions of RA preambles.

In 5G NR, it is specified that the Random access preambles can only be transmitted in the time resources given by the higher-layer parameter prach-ConfigurationIndex according to Tables 6.3.3.2-2 to 6.3.3.2-4 and depends on FR1 or FR2 (see, e.g., 3GPP TS38.211, section 6.3.3.2, v15.6.0) and the spectrum type corresponding to one of unpaired or paired spectrum (see, e.g., TS38.104).

Random access preambles can only be transmitted in the frequency resources given by the higher-layer parameter msg1-FrequencyStart. The PRACH frequency resources $n_{RA} \in \{0, 1, \ldots, M-1\}$, where M equals the higher-layer parameter msg1-FDM, are numbered in increasing order within the initial uplink bandwidth part during initial access, starting from the lowest frequency. Otherwise, $n_{RA}$ are numbered in increasing order within the active uplink bandwidth part, starting from the lowest frequency.

For the purpose of slot numbering in the tables, the following subcarrier spacing shall be assumed:
 15 kHz for FR1
 60 kHz for FR2.

For handover purposes to a target cell in paired or unpaired spectrum where the target cell uses $L_{max}=4$, the UE may assume the absolute value of the time difference between radio frame i in the current cell and radio frame i in the target cell is less than $153600T_s$ if the association pattern period in Section 8.1 of [5, TS 38.213] is not equal to 10 ms.

For inter frequency handover purposes where the source cell is either in paired or unpaired spectrum and the target cell is in unpaired spectrum and uses $L_{max}=8$, the UE may assume the absolute value of the time difference between radio frame i in the current cell and radio frame i in the target cell is less than $76800T_s$.

For sake of brevity, the following exemplary table reproduces only a small part of the above referenced Table 6.3.3.2-2 of 3GPP TS38.211 v.15.6.0, namely this table indicates only those random access configurations which are for indexes in the range of 0-27 and 255.

TABLE 1

Random Access Configurations for 15 kHz SCS and Paired Spectrum/Supplementary Uplink

| PRACH Configuration Index | Preamble format | $n_{SFN}$ mod x = y | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 1 | 0 | — | — | 0 |
| 1 | 0 | 16 | 1 | 4 | 0 | — | — | 0 |
| 2 | 0 | 16 | 1 | 7 | 0 | — | — | 0 |
| 3 | 0 | 16 | 1 | 9 | 0 | — | — | 0 |
| 4 | 0 | 8 | 1 | 1 | 0 | — | — | 0 |
| 5 | 0 | 8 | 1 | 4 | 0 | — | — | 0 |
| 6 | 0 | 8 | 1 | 7 | 0 | — | — | 0 |
| 7 | 0 | 8 | 1 | 9 | 0 | — | — | 0 |
| 8 | 0 | 4 | 1 | 1 | 0 | — | — | 0 |
| 9 | 0 | 4 | 1 | 4 | 0 | — | — | 0 |

TABLE 1-continued

Random Access Configurations for 15 kHz SCS and Paired Spectrum/Supplementary Uplink

| PRACH Configuration Index | Preamble format | $n_{SFN}$ mod x = y | | Subframe number | Starting symbol | $N_t^{RA,slot}$, number of PRACH slots within a subframe | $N_{dur}^{RA}$ occasions within a PRACH slot | $N_{dur}^{RA}$, PRACH duration |
|---|---|---|---|---|---|---|---|---|
| | | x | y | | | | | |
| 10 | 0 | 4 | 1 | 7 | 0 | — | — | 0 |
| 11 | 0 | 4 | 1 | 9 | 0 | — | — | 0 |
| 12 | 0 | 2 | 1 | 1 | 0 | — | — | 0 |
| 13 | 0 | 2 | 1 | 4 | 0 | — | — | 0 |
| 14 | 0 | 2 | 1 | 7 | 0 | — | — | 0 |
| 15 | 0 | 2 | 1 | 9 | 0 | — | — | 0 |
| 16 | 0 | 1 | 0 | 1 | 0 | — | — | 0 |
| 17 | 0 | 1 | 0 | 4 | 0 | — | — | 0 |
| 18 | 0 | 1 | 0 | 7 | 0 | — | — | 0 |
| 19 | 0 | 1 | 0 | 1, 6 | 0 | — | — | 0 |
| 20 | 0 | 1 | 0 | 2, 7 | 0 | — | — | 0 |
| 21 | 0 | 1 | 0 | 3, 8 | 0 | — | — | 0 |
| 22 | 0 | 1 | 0 | 1, 4, 7 | 0 | — | — | 0 |
| 23 | 0 | 1 | 0 | 2, 5, 8 | 0 | — | — | 0 |
| 24 | 0 | 1 | 0 | 3, 6, 9 | 0 | — | — | 0 |
| 25 | 0 | 1 | 0 | 0, 2, 4, 6, 8 | 0 | — | — | 0 |
| 26 | 0 | 1 | 0 | 1, 3, 5, 7, 9 | 0 | — | — | 0 |
| 27 | 0 | 1 | 0 | 0, 1, 2, 3, 4, 5, 6, 7, 8, 9 | 0 | — | — | 0 |
| ... | ... | ... | ... | ... | ... | ... | ... | ... |
| ... | ... | ... | ... | ... | ... | ... | ... | ... |
| ... | ... | ... | ... | ... | ... | ... | ... | ... |
| 255 | C2 | 1 | 0 | 1, 3, 5, 7, 9 | 0 | 7 | 2 | 6 |

Figure 7:
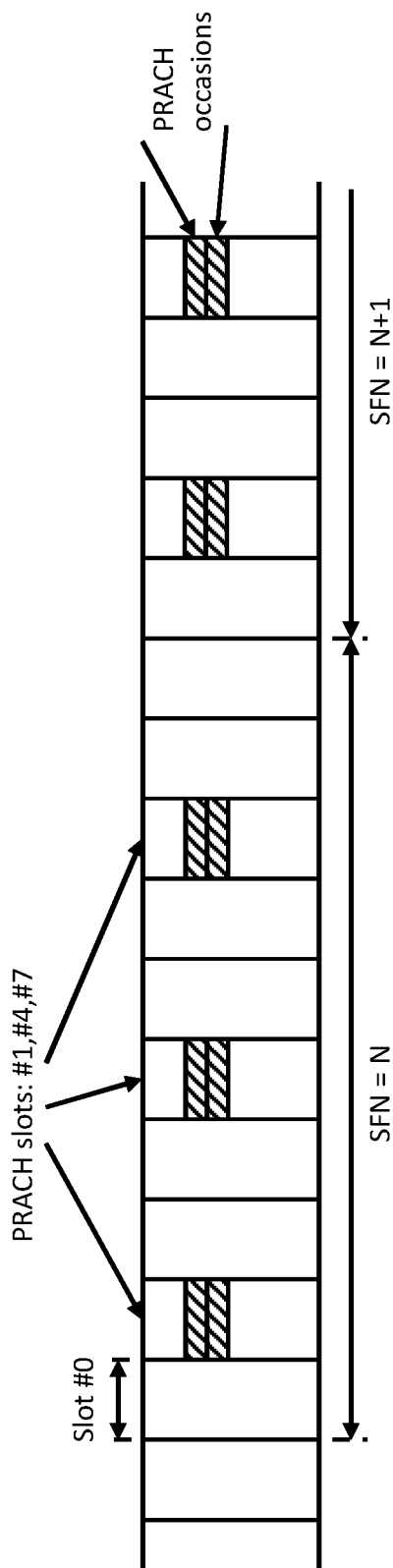
FIG. 7 shows an exemplary configuration of PRACH, namely a configuration for parameter prach-Configuration-Index=22, and parameter msg1-FDM=2.

FIG. 7 illustrates an exemplary configuration of PRACH, namely showing a configuration for parameter prach-ConfigurationIndex=22, and parameter msg1-FDM=2. In particular, the index=22 prescribes the PRACH occasions to be located in subframes #1, #4 and #7. Also, this configuration defines a separate PRACH slot for each of the subframes #1, #4 and #7. Additionally, the example assumes two PRACH frequency resources $n_{RA} \in \{0, 1, \ldots, M-1\}$, namely for the case where M=2.

Access to Unlicensed Spectrum

In view of the objective to satisfy the ever-growing demand for wireless broad band communication, a "Study on NR-based Access to Unlicensed Spectrum" has been carried out (see, e.g., 3GPP TS38.889 v16.0.0). This study details various regulatory requirements for below 7 GHz band, e.g., 5 GHz and 6 GHz band unlicensed operation, and discusses different deployment scenarios. Further, design targets, functionalities and solutions are discussed, and performance evaluations are given.

The study identifies five possible deployment scenarios (see, e.g., 3GPP TS38.889 section 6 v.16.0.0), namely Scenario A: Carrier aggregation between licensed band NR (PCell) and NR-U (SCell) and/or NR-U SCell may have both DL and UL, or DL-only. Scenario B: Dual connectivity between licensed band LTE (PCell) and NR-U (PSCell) Scenario C: Stand-alone NR-U Scenario D: An NR cell with DL in unlicensed band and UL in licensed band, Scenario E: Dual connectivity between licensed band NR (PCell) and NR-U (PSCell).

Further, depending on region and band, regulatory requirements have to be taken into account. Such requirements may comprise dynamic frequency selection (DFS), transmit power control (TPC), Listen-Before-Talk (LBT) and discontinuous transmission with limited maximum transmission duration (may also be termed channel occupancy time, COT). All these requirements for different regions and bands at 5 GHz must be addressed on the system design level, recognizing that the scope is to create a single global solution framework for NR based access to unlicensed spectrum.

Listen-Before-Talk (LBT) for Unlicensed Spectrum

The listen-before-talk (LBT) procedure is defined as a mechanism by which devices perform a clear channel assessment (CCA) check before using a channel. According to one exemplary implementation, the CCA utilizes at least energy detection to determine the presence or absence of other signals on an unlicensed channel in order to determine if a channel is occupied or clear, respectively. European and Japanese regulations for instance mandate the usage of LBT in the unlicensed bands. Apart from regulatory requirements, this carrier sensing via LBT is one way for fair sharing of the unlicensed spectrum and is thus considered to be a vital feature for fair and friendly operation in the unlicensed spectrum in a single global solution framework.

In the unlicensed spectrum, the channel availability cannot always be guaranteed. In addition, certain regions such as Europe and Japan prohibit continuous transmissions and impose limits on the maximum duration of a transmission burst in the unlicensed spectrum (maximum channel occupancy). Hence, discontinuous transmission with limited maximum transmission duration is a functionality for 5G NR.

Following this European regulation on LBT, a device has to observe the channel for a certain minimum time (e.g., for Europe 20 µs, see ETSI 301 893, clause 4.8.3) during the CCA. The channel is considered occupied if the detected energy level exceeds a configured CCA threshold (e.g., for Europe, −73 dBm/MHz, see ETSI 301 893, clause 4.8.3), and conversely is considered to be free (clear) if the detected power level is below the configured CCA threshold. If the channel is determined as being occupied, it shall not transmit on that channel during the next Fixed Frame Period. If the channel is classified as free, the equipment is allowed to transmit immediately. The maximum transmit duration is restricted in order to facilitate fair resource sharing with other devices operating on the same band.

The CCA can be performed repeatedly, optionally with a backoff time in between.

Furthermore, the total time during which a device performs transmissions on a given carrier without re-evaluating the availability of that carrier (i.e., LBT/CCA) is defined as the channel occupancy time (see, e.g., ETSI 301 893, clause 4.8.3.1). The channel occupancy time shall be in the range of 1 ms to 10 ms, where the maximum channel occupancy time could be, e.g., 4 ms as currently defined for Europe.

Furthermore, there is a minimum Idle time the UE is not allowed to transmit after a transmission on the unlicensed cell, the minimum Idle time being at least 5% of the channel occupancy time. Towards the end of the Idle Period, the UE can perform a new CCA, and so on. Moreover, the CCA may not be required within a specific time period after receiving a signal by another entity, e.g., within 16 µs, as part of a shared COT. For instance, switching between DL and UL, and between UL and DL, within a shared gNB COT, does not require LBT.

To comply with this European Regulation on LBT, the 3GPP study (see 3GPP TS38.889, section 8.2 v.16.0.0) which is to classify the NR-based access for unlicensed spectrum into four different categories:

Category 1: Immediate transmission after a short switching gap. This is used for a transmitter to immediately transmit after a switching gap inside a COT. The switching gap from reception to transmission is to accommodate the transceiver turnaround time and is no longer than 16 µs.

Category 2: LBT without random back-off. The duration of time that the channel is sensed to be idle before the transmitting entity transmits is deterministic.

Category 3: LBT with random back-off with a contention window of fixed size. The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel.

Category 4: LBT with random back-off with a contention window of variable size. The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel.

For different transmissions in a COT and different channels/signals to be transmitted, different categories of channel access schemes can be used.

Frame Structure for Unlicensed Spectrum

Further, the study describes 'solutions' to a technically beneficial specification of the frame structure for operation in unlicensed spectrum (see, e.g., 3GPP TS38.889 section 7.2.1.1 v.16.0.0). In particular, it is identified beneficial to support a frame structure which has a single or multiple DL to UL and UL to DL switching points within a shared gNB channel occupancy time (COT). Further, listen before talk (LBT) requirements to support the single or multiple switching points have been identified (see, e.g., 3GPP TS38.889 Section 7.2.1.3.1 v.16.0.0).

For NR-U DL operation, it is identified that being able to operate all DL signal/channels with the same numerology for a carrier and at least for intra-band CA on serving cells on unlicensed bands has at least the following benefits (at least for standalone operation) lower implementation complexity (e.g., a single FFT, no switching gaps), lower specification impact, no need for gaps for measurements on frequencies with a configured serving cell in unlicensed bands.

For NR-U UL operation, it is identified that being able to operate all UL signal/channels (except PRACH) with the same numerology for a carrier and at least for intra-band CA on serving cells on unlicensed bands has at least the following benefits: lower implementation complexity (e.g., a single FFT, no switching gaps), lower specification impact, common interlace structure, no need for gaps for transmission of SRS on a configured serving cell in unlicensed bands.

For unlicensed PCell, the UE assumes single SSB numerology per band.

It has been identified to be beneficial for the NR-U design to not require the gNB to change a pre-determined TBS for a PDSCH transmission depending on the LBT outcome, at least when the PDSCH is transmitted at the beginning of the gNB's COT.

The following options have been identified as possible candidates for PDSCH transmission in the partial slot at least for the first PDSCH(s) transmitted in the DL transmission burst. The options are not mutually exclusive.

Option 1: PDSCH(s) as in Rel-15 NR
Option 2. Punctured PDSCH depending on LBT outcome
Option 3: PDSCH mapping type B with durations other than 2/4/7 symbols
Option 4: PDSCH across slot boundary In addition to the functionalities provided by DCI format 2_0 in Rel-15 NR, indication of the COT structure in the time domain has been identified as being beneficial.

It has been identified to be beneficial for the NR-U design to not require the UE to change a granted TBS for a PUSCH transmission depending on the LBT outcome.

The following options have been identified as possible candidate at least for the first PUSCH(s) transmitted in the UL transmission burst. It is noted that above options are not mutually exclusive.

Option 1: PUSCH(s) as in Rel-15 NR
Option 2: Multiple starting positions in one or multiple slot(s) are allowed for PUSCH(s) scheduled by a single UL grant (i.e., not a configured grant) and one of the multiple PUSCH starting positions can be decided depending on LBT outcome.

It is noted that for above options, the ending position of the PUSCH is fixed as indicated by the UL grant.

Figure 8:
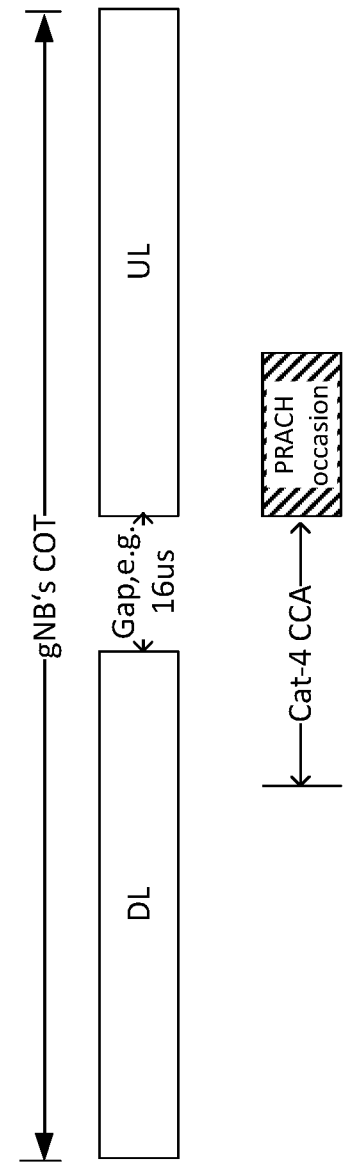
FIG. 8 depicts an exemplary frame structure of a gNB's channel occupancy time (COT) including a single DL to UL switching point and comprising a switching gap.

FIG. 8 illustrates an exemplary frame structure for a shared gNB's channel occupancy time, COT. This frame structure includes a single DL to UL switching point and comprises a switching gap to accommodate the gNB's transceiver turnaround time for switching from transmission to reception which is, e.g., 16 µs.

Recognizing that 3GPP permits the use of different LBT categories for different transmissions and different channels/ signals in a COT, the example assumes a situation where a LBT category 4 is prescribed for a UE's PRACH transmission.

This may, however, result in a situation where no UE can utilize the indicated PRACH occasion because the lengthy gap duration, prescribed by LBT category 4, overlaps with downlink transmission of the gNB, hence resulting in a negative CCA.

Generic Scenario

Considering the above, the authors of the present disclosure have recognized that there is a need to flexibly support downlink/uplink switching points within the gNB's channel occupancy time (COT). Such flexible support will play a key role in a widespread acceptance of channel access schemes for unlicensed spectrum. At the same time, the authors of the present disclosure have recognized that the implementation of listen-before-talk (LBT) has not received sufficient attention to assure regulatory conformance while permitting flexibly support for downlink/uplink switching points within the gNB's channel occupancy time (COT).

For uplink transmissions, especially for unscheduled PRACH transmissions, an extra degree of attention is necessary when introducing transmission gaps within the gNB's COT so as to facilitate UE's uplink transmissions.

Before a UE may perform an uplink transmission, it has to successfully complete the clear channel assessment (CCA) as part of the listen-before-talk (LBT) operation. This may seem contradictory from the perspective that this CCA occurs during the gNB's COT namely at a time where the gNB has occupied the channel. However, such contradiction satisfies regulatory requirements and is easily resolved. The gNB will have to adapt the uplink scheduling to accommodate for such transmission gaps within its COT, thereby facilitating a successful completion of the UE's LBT operation.

While this adaptation of the gNB's uplink schedule appears simple and straight forward in case of scheduled uplink transmissions, this may be less so in case of unscheduled uplink transmissions. For given PRACH resources, the gNB does not know in advance, whether or not it will receive therein an unscheduled PRACH transmissions. Thus, the gNB does not know whether or not it will have to adapt the (entire) uplink scheduling to accommodate for such transmission gaps within its COT, thereby facilitating a successful completion of the UE's LBT operation.

For this reason, the authors of the present disclosure propose introducing a mechanism according to which the gNB provides all concerned UEs with an indication of a timing of channel resources which are to be used for a physical random access channel (PRACH) transmission. It will be readily understood that such timing indication can have various forms and may be provided separately or in combination with other, functionally related information.

In any case, with this timing indication the gNB makes all UEs aware that it adapts the uplink scheduling to accommodate for a transmission gap in its COT before the channel resources which are to be used for PRACH transmissions. Thereby, the gNB permits a successful completion of a UE's LBT operation before actually performing the PRACH transmission in the channel resources to be used.

The skilled reader will understand from the following description that the proposed timing indication is neither intended nor capable to replace any configuration of channel resources for PRACH. Rather, this timing indication has proven beneficial to complement such configuration with regard to the specifics of channel access schemes for unlicensed spectrum.

FIG. 9 shows an exemplary communication system including a user equipment (UE) 910 and a base station (BS) 960 in a wireless communication network. Such communication system may be a 3GPP system such as NR and/or LTE and/or UMTS. For example, as illustrated in the figure, the base station (BS) may be a gNB (gNodeB, e.g., an NR gNB) or an eNB (eNodeB, e.g., an LTE gNB). However, the present disclosure is not limited to these 3GPP systems or to any other systems.

Even though the embodiments and exemplary implementations are described using some terminology of 3GPP systems, the present disclosure is also applicable to any other communication systems, and in particular in any cellular, wireless and/or mobile systems.

Rather, it should be noted that many assumptions have been made herein so as to be able to explain the principles underlying the present disclosure in a clear and understandable manner. These assumptions are however to be understood as merely examples for illustration purposes and should not limit the scope of the disclosure. A skilled reader will be aware that the principles of the following disclosure and as laid out in the claims can be applied to different scenarios and in ways that are not explicitly described herein.

A mobile terminal is referred to in the LTE and NR as a user equipment (UE). This may be a mobile device such as a wireless phone, smartphone, tablet computer, or an USB (universal serial bus) stick with the functionality of a user equipment. However, the term mobile device is not limited thereto, in general, a relay may also have functionality of such mobile device, and a mobile device may also work as a relay.

A base station (BS) forms at least part of a system of interconnected units, for instance a (central) baseband unit and different radio frequency units, interfacing different antenna panels or radio heads in the network for providing services to terminals. In other words, a base station provides wireless access to terminals.

Referring back to the figure, the user equipment 910 comprises processing circuitry (or processor) 930 and a transmitter/receiver (or transceiver) 920 which are indicated as separate building blocks in the diagram. Similarly, base station 960, comprises processing circuitry (or processor) 980 and a transmitter/receiver (or transceiver) 970, which are indicated as separate building blocks in the diagram. The transmitter/receiver 920 of the user equipment 910 is communicatively coupled via a radio link 950 with the transmitter/receiver 970 of the base station 960.

FIGS. 10 and 11 depict exemplary implementations of the building blocks of the user equipment 910 and of the base station 960 according to a generic scenario.

The user equipment 910 of the exemplary implementation comprises an uplink (UL) symbol configuring processing circuitry 930-*a*, a physical random access channel (PRACH) channel resource timing indication receiver 920-*a*, a PRACH channel resource determining processing circuitry 930-*b*, a clear channel assessment (CCA) performing processing circuitry 930-*c*, and a PRACH transmission transmitter 920-*b*. Similarly, the bases station 960 of the exemplary implementation comprises an UL symbol configuring processing circuitry 980-*a*, a PRACH channel resource timing indication transmitter 970-*a*, a PRACH channel resource determining processing circuitry 980-*b*, a transmission gap identification processing circuitry 980-*c*, a PRACH transmission receiver 970-*b*.

The present disclosure is given with the assumption that the user equipment 910 is to perform a PRACH transmission. This PRACH transmission may be part of a random access (RA) procedure such as the contention-based RA procedure discussed before, or alternatively a non-contention-based RA procedures, or even other forms of RA procedures. In any case, the present disclosure shall not be understood as being restricted to any such RA procedures.

In any case, the present disclosure shall be understood to cover also situations where the user equipment 910 performs a PRACH transmission without the intention or necessity to further perform the remaining steps of a RA procedure. In other words, the user equipment 910 may also perform the PRACH transmission as part of a one-shot signaling mechanism, for instance, to convey to the base station 960 a pre-defined information through the transmission of a pre-defined RA preamble.

Further, the present disclosure is given for a use case that the user equipment 910 performs the PRACH transmission within an unlicensed spectrum. Rather than considering uses case where the RACH transmission is performed within licensed spectrum, the user equipment 910 has to cope with the uncertainty that indicated channel resources (or, more precisely the timing indication of channel resources) may not be used for the PRACH transmission. Then, same PRACH transmission has to be aborted.

In other words, the unlicensed spectrum operation adds the uncertainty to the PRACH transmission that the user equipment 910 has to confirm (determine affirmatively) that a timing indication of channel resources which are (in general) to be used for PRACH transmission can at a (specific) occupancy time of the unlicensed spectrum actually be use for the PRACH transmission.

For ease of reference, the unlicensed spectrum operation is denoted in the following as transmissions which are performed by the user equipment 910 over (via) channel resources of an unlicensed channel. Such an unlicensed channel in this regard refers to channel resources within unlicensed spectrum which are to be used for uplink communication, particularly for the PRACH transmission, which the user equipment 910 is to perform.

It should go without mention that the unlicensed spectrum operation (or uplink communication over unlicensed channel) complies with the regulatory requirements discussed above. This includes complying with listen-before-talk (LBT) including the clear channel assessment (CCA) which is also mandatorily for the user equipment 910 prior to the actual uplink communication. Only when CCA is affirmative, then the user equipment 910 can perform the uplink communication.

FIG. 12 depicts a sequence diagram of a user equipment (UE) performing a PRACH transmission according to the generic scenario, namely where the PRACH transmission of the user equipment 910 is performed over an unlicensed channel so that a transmission gap of an according gap duration has to be checked before the PRACH transmission is actually being performed.

The user equipment 910, specifically processing circuitry 930 of FIG. 9, configures (see, e.g., step S01 of FIG. 12) at least one symbol of an occupancy time of the unlicensed channel for uplink communication. This configuration operation of the at least one symbol for uplink configuration is based on a received unlicensed channel access configuration. This configuration operation may be performed, for instance, by uplink symbol configuring processing circuitry 930-a shown in FIG. 11.

The unlicensed channel access configuration pertains to a (specific) unlicensed channel. In other words, the configuration permits the user equipment 910 to configure the access (here: at least one symbol for uplink configuration) of the respective unlicensed channel. The at least one symbol is a channel resource of the unlicensed channel.

The present disclosure is given with a focus on time resources rather than frequency resources. This generalization has merely been introduced for the sake of simplicity. It shall also cover deployment scenarios where the uplink communication is performed over channel resources which are specified by both time and frequency resources, such as resource elements which are composed of one subcarrier for the length of one symbol, namely an OFDM/SC-FDMA symbol. Such resource elements are also channel resources of the unlicensed channel.

In an exemplary implementation, the user equipment 910 receives the configuration, on which the configuration operation is based, via receiver 920 of FIG. 9. In another exemplary implementation, the user equipment 910 receives the configuration from a memory which is temporarily or permanently storing the configuration for the processing circuitry 930 to perform the configuration operation.

In the context of the present disclosure, the received unlicensed channel access configuration can support different implementations.

In one exemplary implementation, this configuration is exclusive for configuring the at least one symbol for uplink communication. In another exemplary implementation, the configuration is not only (not exclusive) for configuring the at least one symbol for uplink communication. Rather, based on the same configuration also at least one (some) other (different) symbol may be configured for downlink communication.

In a further exemplary implementation, this configuration comprises information which designates respective symbols as uplink symbols, downlink symbols or flexible symbols. In yet another exemplary implementation, this configuration specifies switching time instances for switching between downlink and uplink or uplink and downlink communication. Based on such switching time instances, the user equipment 910 is also capable to configure the at least one symbol for uplink communication.

In another exemplary implementation, this configuration is prescribing uplink communication and/or downlink communication not on symbol level but instead on a courser granularity such as on a slot level or a subframe level. Also here the user equipment 910 is cable of configuring all of the symbols of the respective slot or subframe as the at least one symbol for uplink communication.

In a further exemplary implementation, this configuration pertains (only) to at least one individual slot of the occupancy time of the unlicensed channel such that the configuration operation of the respective symbols of the (said) at least one individual slot is based on the configuration.

Particularly where the configuration pertains to plural individual slots of the occupancy time of the unlicensed channel, this configuration enables configuring one of the (said) plural individual slots which is entirely (or only) comprised of symbols designated as uplink symbols or entirely (or only) comprised of symbols designated as downlink symbols. In other words, an overlap is created.

Assuming for the sake of argument that a slot is only comprised of designated uplink symbols, then due to the absence of downlink symbols the according configuration cannot be signaled during this slot. Accordingly, should the configuration be signaled for each individual slot separately, this would not be possible for the individual slot which is only comprised of designated uplink symbols. To avoid such situation, the configuration may pertain to plural (overlapping) slots of the occupancy time.

In yet another exemplary implementation, the configuration pertains to the (complete) occupancy time of the unlicensed channel such that the configuration operation of all symbols of the (complete) occupancy time is based on the configuration.

In an even further exemplary implementation, this configuration pertains to at least one slot (or subframe or radio frame) irrespective of whether or not the (said) at least one individual slot is included (encompassed) in the occupancy time. In this regard, the user equipment 910 first determines the occupancy time and then configures only symbols of the respective at least one individual slot (or subframe or radio frame) based on the configuration which are included in the determined occupancy time.

In another exemplary implementation, this configuration is received by the user equipment 910 in form of semi-static signaling. Considering the signaling overhead inherent to semi-static signaling, same form of signaling facilitates the configuration of symbols of the (complete) occupancy time, namely from the time instance and for the duration the unlicensed channel is occupied.

Such semi-static signaling may rely on RRC signaling mechanisms, preferably including at least one broadcast system information, SI, block or SI message (e.g., SIB1) or a dedicated RRC message with an Information Element carrying the respective configuration and/or indication.

This form of signaling also facilitates the configuration of at least one slot (or subframe or radio frame) irrespective of whether the (said) at least one individual slot is included in the occupancy time. Even then, when the configuration itself is irrespective of the occupancy time, this configuration is conveyed for specifying the (complete) occupancy time, namely from the time instance and for the duration the unlicensed channel is occupied.

In a further exemplary implementation, this configuration is received by the user equipment 910 in form of dynamic signaling. Considering the low latency inherent to dynamic signaling, same form of signaling facilities the configuration of symbols of only parts (e.g., individual slots, or subframes or radio frames) of the occupancy time of the unlicensed channel. Thus, the user equipment 910 receives a plurality of configurations over the duration of the occupancy time.

Such dynamic signaling may rely on media access control, MAC, signaling, preferably including at least one MAC control element, MAC CE, carrying the respective configuration, or physical, PHY, signaling, preferably including at least one downlink control information, DCI, (e.g., of DCI Format 2-0) carrying the respective configuration.

It should go without mention that the above exemplary implementations are not describing mutually exclusive alternatives but can be combined to form a single functioning implementation. For example, such a combination may involve both semi-static and dynamic signaling in the form that the dynamic signaling may override at the user equipment 910 a configuration which comes from the semis-static signaling wherever it is present.

Then, the user equipment 910, specifically the receiver 920 of FIG. 9, receives (see, e.g., step S02 in FIG. 12) an indication of a timing of channel resources which are to be used for a physical random access channel, PRACH, transmission. This reception operation may be performed, for instance, by PRACH channel resource timing indication receiver 920-a shown in FIG. 11.

In the conceived deployment scenario, there exist plural different physical uplink channels, such as PUSCH, PUCCH, . . . , which are different from PRACH. And, the unlicensed channel access configuration enables the user equipment 910 to configure the at least one symbol for uplink resources, irrespective of the physical uplink channel with which it is to be used.

For this reason, the user equipment 910 additionally receives the timing indication of the channel resources which are to be used for a PRACH transmission. In other words, the received timing indication indicates timing (such as, e.g., start time and/or time duration) of channel resources which are to be used by the user equipment 910 for the PRACH transmission.

At the same time the received timing indication of the channel resources for PRACH transmissions does not take account of whether or not the unlicensed channel is actually occupied. In other words, the timing indication does not reflect whether or not the unlicensed channel access configuration enables the configuration of the at least one symbol for uplink communication at the indicated timing of the channel resources for PRACH transmissions.

Hence, the user equipment 910, specifically the processing circuit 920 of FIG. 9, determines (see, e.g., step S03 of FIG. 12) whether or not the indicated timing of channel resources which are to be used for the PRACH transmission are included within the at least one symbol configured for uplink communication. In other words, the user equipment 910 determines, whether or not the indicated timings of channel resources for the PRACH transmission fit into the configured at least one symbol for uplink communication. This determination operation may be performed, for instance, by PRACH channel resource determining processing circuitry 930-b shown in FIG. 11.

Assuming for the sake of example that the indicated timings of channel resources for PRACH transmissions are received by the user equipment 910. However, as stated before, the indicated timings do not take account of the occupancy time itself (e.g., its start time or time duration) nor adaptations to its (re-)configuration resulting from re-purposing individual symbols or slots or subframes of the occupancy time to match, e.g., a reduced demand for uplink communication over the unlicensed channel. Then due to the absence of such account taking, the user equipment 910 is required to always determine, whether or not the indicated timings of channel resources for the PRACH transmission fit the (re-)configuration of the occupancy time.

For instance, the reduced demand for uplink communication may prompt the (re-)configuration of the occupancy time so that symbols for downlink communication outnumber symbols for uplink communication. Then, the determining operation ensures that the user equipment 910 still will only use those indicated timings of channel resource for PRACH transmissions which fit the outnumbered symbols for uplink communication configured based on the (re-) configured occupancy time.

The above described separation of information has proven advantageous in that it divides each functionality into what it is intended for, namely the unlicensed channel access configuration to specify (on a high-level) the access to the unlicensed channel during the occupancy time, and timing indication to specify (on a low-level) the timings of channel resources for PRACH transmissions. Only with both separate information, the PRACH transmissions are facilitated over the unlicensed channel.

In the context of the present disclosure, the received timing indication of PRACH channel resources can support different implementations.

In an exemplary implementation, the received timing indication indicates the timing of the channel resources in form of a start time and/or a time duration of the channel resources to be used for the PRACH transmission. In other words, the timing indication is explicitly indicating the timing of the PRACH channel resources. From such timing indication, the user equipment 910 can infer the indicated timing of the channel resources for the PRACH transmission.

For instance, the received timing indication may indicate, according to this exemplary implementation, that the PRACH channel resources have the start timing of symbol #0 and/or have a time duration of 14 symbols. Thus, such timing indication indicates that (all) the symbols #0 to #13 of an individual slot are channel resources (e.g., a PRACH slot) to be used for the PRACH transmission. From such timing indication, the user equipment 910 can infer the indicated timing of the channel resources for the PRACH transmission.

In another exemplary implementation, the received timing indication indicates an index of a pre-configured table, such as the Table 1 described above, or any of the Tables 6.3.3.2-2 to 6.3.3.2-4 of 3GPP TS38.211 v.15.6.0. Again, the timing indication is explicitly indicating the timing of the PRACH channel resources. And from such timing indication, the user equipment 910 can also infer the indicated timing of the channel resources for the PRACH transmission with reference to the according pre-configured table.

For instance, the received timing indication may indicate, according to this exemplary implementation, the index 22 of the pre-configured Table 1, from which the user equipment 910 then can infer that (all) the symbols #0 to 14 of an individual slot (here: slots #1, #4, and #7) are channel resources (e.g., a PRACH slot) to be used for the PRACH transmission.

In a further exemplary implementation, the received timing indication may indicate an enable/disable information for a previously transmitted (pre-configuring) index of a pre-configured table, such as Table 1 described above or any of the Tables 6.3.3.2-2 to 6.3.3.2-4 of 3GPP TS38.211 v.15.6.0. This timing indication is implicitly indicating the timing of the PRACH channel resources. Again from such timing indication, the user equipment 910 can also infer the indicated timing of the enabled/disabled channel resources for the PRACH transmission with reference to the according previously transmitted index of the pre-configured table.

For instance, the received timing indication may indicate, according to this exemplary implementation, an enable information for a previously transmitted (pre-configuring) index 22 of the pre-configured Table 1, from which the user equipment 910 then can infer that (all) the symbols #0 to #13 of an individual slot (here: slots #1, #4, #7) are enabled channel resources (e.g., an enabled PRACH slot) to be used for PRACH transmission.

In another exemplary implementation, this timing indication is received by the user equipment 910 in form of semi-static signaling. Considering the signaling overhead inherent to semi-static signaling, same form of signaling facilitates the indication of timings of PRACH channel resources of the (complete) occupancy time, namely from the time instance and for the duration the unlicensed channel is occupied.

Such semi-static signaling may rely on RRC signaling mechanisms preferably including at least one broadcast system information, SI, block or SI message (e.g., SIB1) or a dedicated RRC message with an Information Element carrying the respective configuration and/or indication.

This form of signaling also facilitates the indication of timings of PRACH channel resources is for at least one slot (or subframe or radio frame) irrespective of whether the (said) at least one individual slot is included in the occupancy time. Even then, when the timing indication of PRACH resources itself is irrespective of the occupancy time, this timing indication is conveyed for specifying the (complete) occupancy time, namely from the time instance and for the duration the unlicensed channel is occupied.

In a further exemplary implementation, this indication of timings of PRACH channel resources is received by the user equipment 910 in form of dynamic signaling. Considering the low latency inherent to dynamic signaling, same form of signaling facilities the indication of timings of PRACH channel resources of only parts (e.g., individual slots, or subframes or radio frames) of the occupancy time of the unlicensed channel. Thus, the user equipment 910 receives a plurality of timing indications over the duration of the occupancy time.

Such dynamic signaling may rely on media access control, MAC, signaling, preferably including at least one MAC control element, MAC CE, carrying the respective timing indication, and physical, PHY, signaling, preferably including at least one downlink control information, DCI, (e.g., of DCI format 2-0) carrying the respective timing indication.

In yet another exemplary implementation, there exists fixed association between the type of signaling used when receiving the timing indication, and the when the user equipment 910 makes use of the received timing indication to infer the respective channel resources to be used for the PRACH transmissions. In other words, the type of signaling prescribes when the timing indication is to be used.

Considering the case where the timing indication is received in form of semi-static signaling and the user equipment 910 infers the indicated timing from this semi-static signaling. Then, the user equipment 910 associates (with the help of a fixed association) the indicated timing with a pre-configuration for the (complete) occupancy time of the unlicensed channel. In other words, the indicated timing of the channel resources is pre-configured for the occupancy time of the unlicensed channel;

Considering the case where the timing indication is received in form of dynamic signaling, and the user equipment 910 infers the indicated timing from this dynamic signaling. Then, the user equipment 910 associates (with the help of a fixed association) the at least some previously configured channel resources, with channel resources to be enabled/disabled which are relative to when the signaling is received.

For instance, dynamic signaling may indicated the timing, according to this exemplary implementation, in form an enable information. This enable information is interpreted to be for a previously transmitted (pre-configuring) index 22 of the pre-configured Table 1, from which the user equipment 910 then can infer that (all) the symbols #0 to #14 of an individual slot are enabled channel resources (e.g., an enabled PRACH slot) to be used for PRACH transmission.

Assuming further to this exemplary implementation that the dynamic signaling is received in a particular slot, e.g., slot #0 of the occupancy time of the unlicensed channel, then the user equipment 910 associates (with the help of the fixed association) the channel resources previously configured through the transmitted index 22, with channel resources to be enabled which are exactly of the subsequent slot #1 relative to when the signaling is received (e.g., in slot #0).

Hence, the enable/disable information may only pertain the those previously configured channel resources which are within a prescribed time interval (e.g., two slots, three slots, . . . , two subframes, three subframes, . . . , two radio frames, three radio frames, . . . ) relative to when the signaling is received. In other words, the enable/disable information is due to the use of dynamic signaling associated with a time interval to which it applies.

Considering again the case where the timing indication is received in form of dynamic signaling, and the user equipment 910 infers the indicated timing from this dynamic signaling. Then, in an alternative scenario the indicated timing of channel resources are for parts of the occupancy time of the unlicensed channel relative to when the signaling is received.

Now, the enable/disable information may only pertain the those previously configured channel resources which are within a prescribed time interval (e.g., two slots, three slots, . . . , two subframes, three subframes, . . . , two radio frames, three radio frames, . . . ) relative to when the signaling is received. In other words, the enable/disable information is due to the use of dynamic signaling associated with a time interval to which it applies.

Even though it is not the focus of the present disclosure, it goes without mention that the indication of the timing of the PRACH channel resources can, according to an even further exemplary implementation be combined with an indication of the frequency component of the PRACH resources. This combined indication is then received by the user equipment 910 in a single reception operation.

For example, the frequency indication may indicate an enable/disable information for a previously transmitted parameter, such as the parameter msg1-FDM M discussed above. In this regard, the enable/disable information may enable/disable individual ones or jointly all of the PRACH frequency resources $n_{RA} \in \{0, 1, \ldots, M-1\}$.

Again, it should go without mention that the above exemplary implementations are not describing mutually exclusive alternatives but can be combined to form a single functioning implementation. For example, such a combination may involve both semi-static and dynamic signaling in the form that the dynamic signaling may override at the user equipment 910 a timing indication which comes from the semis-static signaling wherever it is present.

Then the user equipment 910 proceeds in case (see, e.g., step S04 of FIG. 12) the determination is affirmative (case 'Y') whereas in case the determination is not affirmative, namely is negative (case 'N'), it has determined (see, e.g., step S05 of FIG. 12) that the timing indication of the channel resources to be used for the PRACH transmission is invalid.

Again, the received timing indication of the channel resources for PRACH transmissions does not take account of whether or not the unlicensed channel is actually occupied. Hence, it is possible that the determining operation timing indication are simply invalid and for this reason cannot be used.

Further, in case the determination is affirmative (case 'Y'), the user equipment 910, specifically its processing circuitry 920, performs (see, e.g., step S06 of FIG. 12) a clear channel assessment, CCA. The clear channel assessment is performed for a gap duration before the start of the indicated timing of channel resources which are to be used for the PRACH transmission. This CCA operation may be performed, for instance, by CCA performing processing circuitry 930-c of FIG. 11.

In the context of the present disclosure, the CCA operation can support different implementations for obtaining the gap duration.

This CCA operation serves the purpose of assessing whether or not the channel is clear before it can actually perform the PRACH transmission. As discussed above, the CCA is prescribed by the listen-before-talk requirement mandated by regulation requirements for operating over the unlicensed channel. And the CCA ensures that the user equipment 910 does not grab the unlicensed channel in a situation where, in the meantime, another equipment is performing a transmission operation.

In one exemplary implementation, the user equipment 910 receives, specifically its receiver 920, an indication of the gap duration for performing the clear channel assessment (CCA). This gap duration is received before the user equipment 910 intends to perform the PRACH transmission such that it can perform CCA before the start of the indicated timing of channel resources which are to be used for the PRACH transmission.

In another exemplary implementation, the user equipment 910 does not receive the indication of the gap duration. Instead the user equipment 910, specifically its processing circuitry, draws a random number N. And then the user equipment 910 performs CCA for the gap duration which varies in length based on the random number N.

In a further exemplary implementation, it is assumed that plural gap durations are specified, such as, for instance, 16 μs and 25 μs by standardization. And when the user equipment 910 receives an indication of the gap duration, then it receives an indication which one of the plural gap durations it shall use.

For instance, the received indication of the gap duration can distinguish between a first case, where the user equipment 910 knows that the gap duration of 16 μs is to be used for CCA, and a second case, where it knows that the gap duration of 25 μs is to be used.

The gap duration of 16 μs corresponds to a value which has been prescribed by regulatory requirements. The following discussion shall put the gap duration of 16 μs as prescribed by regulatory requirements into perspective.

Assuming a 15 kHz subcarrier spacing, this results in a symbol duration of 66 μs. Here, the gap duration of 16 μs corresponds to approx. 24% of the symbol duration of 66 μs. Assuming then a 60 kHz subcarrier spacing, this results in a symbol duration of 16.5 μs. Here, the gap duration of 16 μs corresponds to 97% of the symbol duration of 16.5 μs. With higher and higher frequencies of the transmission bands, it is generally expected that the subcarrier spacing to be used for the transmission operation will further increase, such as to values of 120 kHz or higher. In these cases, the symbol duration may further reduce such that the gap duration of 16 μs may have a length of more than one symbol.

In yet another exemplary implementation, the user equipment 910 receives the indication of the gap duration in form of one of plural listen-before-talk, LBT categories. In case this one LBT category is only used with a single gap duration, then the user equipment 910 infers from the one LBT category the gap duration that is to be used with the CCA operation.

For instance, for LBT Category 1, the gap duration is less than 16 μs. In such case, the user equipment 910 proceeds to immediate perform the PRACH transmission without performing CCA. Since the gap duration is short enough, no other devices than the indicated one can grab the channel. Therefore, no collision is expected. And the user equipment 910 further behaves as specified for LBT Category 1 as discussed above.

In an even further exemplary implementation, the user equipment 910 receives an indication of one of plural gap durations in combination with an indication of one of plural LBT categories. Then from the indication of the one of the plural gap durations, the user equipment 910 knows the gap duration that is to be used with the CCA operation.

For instance, for LBT Category 2, the gap duration is either 16 µs or 25 µs. As the gap duration of 16 µs is used either for the CCA operation according to LBT Category 1 or for the CCA operation according to LBT Category 2, it may not be sufficient from the signaling of (only) the gap duration for the user equipment 910 to know if it has to behave as specified for LBT Category 1 or as specified for LBT Category 2.

For this reason, the combination of the indication of the gap duration with the indication of the LBT category is advantageous as it prescribes the behavior of the user equipment 910 beyond instructing which gap duration is to be used for CCA operation before the start of the indicated timing of the channel resource to be used for PRACH transmission.

In another exemplary implementation, the user equipment 910 receives an indication of the gap duration which instructs the user equipment 910 that no PRACH transmissions are to be performed. Accordingly, the user equipment 910 aborts the PRACH transmission at the indicated timing of channel resources which are to be used for PRACH transmission.

The above exemplary implementations may be summarized in the following Table 2, according to which the user equipment 910 receives one of the following indications of the gap duration:

TABLE 2

Exemplary Implementation of Indication of Gap Duration for CCA

| Indi. of gap duration | Gap duration, LBT Category |
|---|---|
| 1 | 16 µs, LBT Cat. 1 |
| 2 | 16 µs, LBT Cat. 2 |
| 3 | 25 µs, LBT Cat 2 |
| 4 | No gap, No PRACH |

Then, the user equipment 910 proceeds in case (see, e.g., step S07 of FIG. 12) the CCA is affirmative (case 'Y') whereas in case the CCA is not affirmative, namely is negative (case 'N'), the user equipment 910 aborts the PRACH transmission at the indicated timing of channel resources which are to be used for the RACH transmission.

Further, in case the CCA operation is affirmative (case 'Y'), the user equipment 910, specifically its transmitter 920, performs the PRACH transmission via the channel resources by transmitting a random access, RA, preamble within the at least one symbol configured for uplink communication. The transmission operation is performed, for instance, by PRACH transmission transmitter 930-b.

The above description has been given from the perspective of the user equipment 910. This shall, however, not be understood as a limitation to the present disclosure. The base station 960 equally performs the generic scenario disclosed herein.

Again, the present disclosure is given with the assumption that the base station 960 is to receive a PRACH transmission. This PRACH transmission may be part of a random access (RA) procedure such as the contention-based RA procedure discussed before, or alternatively a non-contention-based RA procedures, or even other forms of RA procedures. In any case, the present disclosure shall not be understood as being restricted to any such RA procedures.

In any case, the present disclosure shall be understood to cover also situations where the base station 960 receives a PRACH transmission without the intention or necessity to further perform the remaining steps of a RA procedure. In other words, the base station 960 may also receive the PRACH transmission as part of a one-shot signaling mechanism, for instance, to convey from a user equipment 910 a pre-defined information through the transmission of a pre-defined RA preamble.

FIG. 13 depicts a sequence diagram of a base station (BS) receiving a PRACH transmission according to the generic scenario, namely where the reception operation of the PRACH transmission of the base station 960 is performed over an unlicensed channel so that a transmission gap of an according gap duration has to be checked before the PRACH transmission is actually being performed.

The base station 960, specifically its processing circuitry 970, configures (see, e.g., step S01 of FIG. 13) at least one symbol of an occupancy time of the respective unlicensed channel for uplink communication. The at least one symbol is configured based on an unlicensed channel access configuration. This configuration operation is performed, for instance, by UL symbol configuring processing circuitry 980-a of FIG. 10.

Then, the base station 960, specifically its transmitter 970, transmits (see, e.g., step S02 of FIG. 13) an indication of a timing of channel resources which are to be used for a physical random access channel, PRACH, transmission. This transmission operation is performed, for instance, by PRACH channel resource timing indication transmitter 970-a.

Subsequently, the base station 960, specifically its processor 980, determines (see, e.g., step S03 of FIG. 13) whether or not the indicated timing of channel resources which are to be used for the PRACH transmission is included within the at least one symbol configured for uplink communication. This determination operation is performed, for instance, by PRACH channel resource determining processing circuitry 980-b.

In case the determination is negative (see, e.g., step S04, case 'N' of FIG. 13), the base station 963 determines (see, e.g., step S05 of FIG. 13) that the indicated timing of channel resource to be used for the PRACH transmission are invalid.

In case the determination is affirmative (see, e.g., step S04, case 'Y' of FIG. 13), the base station 960, specifically its processing circuitry 980, identifies (see, e.g., step S06 of FIG. 13) whether or not a transmission gap is configured with a gap duration before the start of the indicated timing of channel resources which are to be used for the PRACH transmission. This identification operation is performed, for instance, by transmission gap identification processing circuitry 980-c.

In case the identification is negative (see, e.g., step S07, case 'N' of FIG. 13), the base station 960 aborts the reception of the PRACH transmission at the indicated timing of channel resources to be used for the PRACH transmission.

In case the identification (see, e.g., S07, case 'Y' of FIG. 13) of the transmission gap is affirmative, the base station 960, specifically its receiver 970, receives the PRACH transmission in form of a random access, RA, preamble transmitted within the at least one symbol configured for uplink communication at the indicated timing of channel resources which are to be used for the PRACH transmission. This reception operation is performed, for instance, by PRACH transmission receiver 970-*b*.

First Exemplary Implementation

The first exemplary implementation gives a more detailed description of the operation of user equipment 910 according to the generic scenario. In particular, this first exemplary implementation focuses on a scenario where the user equipment 910 performs PRACH transmission over an unlicensed channel which is configured according to channel occupancy time (COT) structure information (or parameters) provided via physical downlink control channel signaling.

Figure 14:
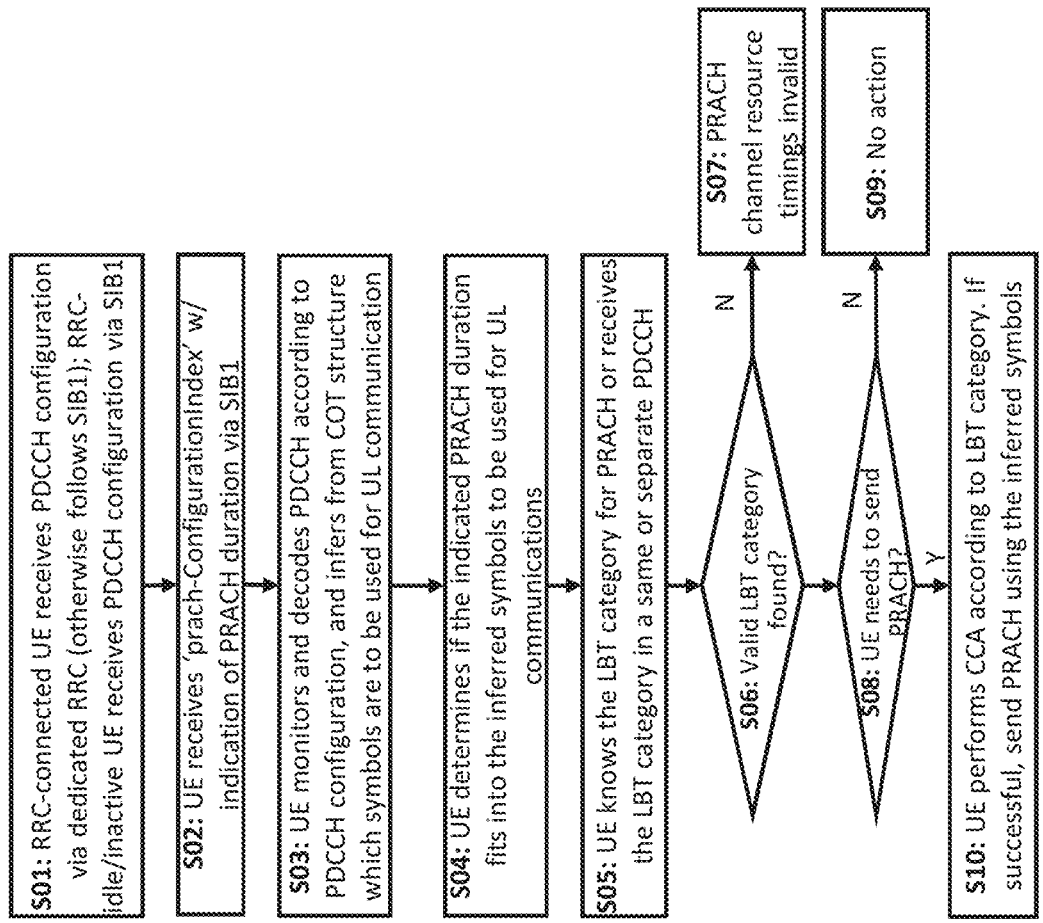
FIG. 14 illustrates a flow diagram for the behavior of a UE, according to a first exemplary implementation of an improved PRACH transmission operation.

In FIG. 14, a flow diagram according to the first exemplary implementation is shown. This flow diagram assumes a 5G NR deployment scenario and uses an according terminology. For example, reference is made not only to the physical random access channel, PRACH, in the uplink, but also to the physical downlink control channel, PDCCH, in the downlink. In this regard, the user equipment 910 is not only performing uplink, namely PRACH transmissions, but it is also performing downlink PDCCH receptions.

For this purpose, the user equipment 910 receives (see, e.g., step S01 of FIG. 14) a PDCCH configuration, which configures the user equipment 910 so that it is capable of receiving control information over the physical downlink control channel. With the PDCCH configuration, the user equipment 910 is configured to receive downlink control information (DCI) over PDCCH.

Two different starting points must be distinguished.

According to a first starting point, the user equipment 910 is in a 'RRC Connected' state. In this 'RRC Connected' state, the user equipment 910 is configured to receive dedicated control messages as specified by RRC (Radio Resource Control) protocol. Then, the user equipment 910 receives the PDCCH configuration via a dedicated RRC control message.

This PDCCH configuration, being received via the dedicated RRC control message, is complementing various cell-specific configurations which are provided via SystemInformationBlockType1 (short: SIB1). The SIB 1 is broadcasted to all user equipment(s) 910 served by the cell. In other words, for all complementing configurations which are not specified in the PDCCH configuration, the user equipment 910 follows SIB1.

According to a second starting point, the user equipment 910 is in a 'RRC Idle' or in a 'RRC Inactive' state. In both these states, the user equipment 910 is not configured to receive dedicated control messages as specified by RRC protocol. Nevertheless, the user equipment 910 is configured to receive cell-specific configurations which are provided via SystemInformationBlockType1 (short: SIB1). In this regard, the user equipment 910 receives the PDCCH configuration via the broadcasted SIB1.

Also, the user equipment 910 receives (see, e.g., step S02 of FIG. 14) via the same (or via a complementing) SIB1, the parameter 'prach-ConfigurationIndex.' This parameter specifies time-domain related aspects for a physical random access channel, PRACH, transmission, such as the slot number or numbers of a radio frame which carry PRACH transmissions, a time duration of the PRACH transmission in number of symbols, a starting symbol of the PRACH transmission, the sequences to be used as RA preamble, etc. In this regard, the parameter 'prach-ConfigurationIndex' indicates a timing (e.g., the time duration) of channel resources to be used by for the PRACH transmission.

In the first exemplary implementation, the user equipment (UE) 910 utilizes all time-domain related aspects which are prescribed by the parameter 'prach-ConfigurationIndex' except the starting symbol of the PRACH transmission. In other words, the user equipment 910 expects that it will be provided with a dynamic indication of the starting symbol which is to be used for the PRACH transmission. The user equipment 910 expects to receive this dynamic indication during the occupancy time of the unlicensed channel. With this separate (dynamic) indication of the starting symbol, an additional degree of flexibility is facilitated, namely in that the dynamic signaling can, even at last moment, instruct a different starting symbol should this become necessary.

Assuming for the sake of example that the signaled parameter 'prach-ConfigurationIndex' has the value 22, then the user equipment 910 infers from the pre-configured Table 1 (discussed above) that slot #1, #4 and #7 are channel resources which are to be used for PRACH transmission. In particular, all these channel resource have a time duration of 14 symbols. However, as described above, this timing indication of the channel resources for PRACH transmissions does not take account of whether or not the unlicensed channel is actually occupied.

In this regard, the user equipment 910 also receives (see, e.g., step S03 of FIG. 14) an unlicensed channel access configuration. In this first exemplary implementation, the unlicensed channel access configuration is signaled in form of a channel occupancy time structure information, henceforth. 'COT structure information.' Based on the received 'COT structure information', the user equipment 910 configures at least one symbol of an occupancy time of the respective unlicensed channel for uplink communication.

In other words, the 'COT structure information' structures the channel occupancy time, namely that time during which the unlicensed channel is occupied for 5G NR operation. For example, if the unlicensed channel was shared between 5G NR operation and WiFi operation, then the occupancy time of the unlicensed channel exclusively refers to the time where this channel is occupied for 5G NR operation, namely where the user equipment 910 can validly expect to receive downlink communication and to be scheduled for uplink communication.

Such an exclusive 5G NR operation, however, does not mean that the user equipment 910 must not perform PRACH transmissions outside of the channel occupancy time (COT). To the contrary, the user equipment 910 in some situations (see for instance the description of FIG. 19) is prompted to perform PRACH transmissions outside of the COT. These PRACH merely differ in that, outside of the COT, interference with WiFi operation is not excluded.

In more detail, the user equipment 910 receives the 'COT structure information' via physical downlink control channel PDCCH, preferably in a respective field of a downlink control information, DCI format. For example, the 'COT structure information' can be transmitted via DCI-Format 2-0 on PDCCH. In more detail, the user equipment 910 monitors and decodes PDCCH according to the PDCCH configuration in order to receive the 'COT structure information.'

The received 'COT structure information' permits the user equipment 910 to configure at least one symbol of an occupancy time of the respective unlicensed channel for uplink communication.

In other words, the 'COT structure information' conveys the information how the individual symbols of the channel occupancy time (COT) are being structured, i.e., when switching points between downlink and uplink (or vice-versa) occur. In more detail, the 'COT structure information' prescribes symbols of plural slots of the occupancy time to be one of an uplink, a downlink or a flexible symbols, the receiver, in operation, receives plural 'COT structure information' with partial overlap.

A specific example of the 'COT structure information' is shown in below Table 3, namely where the 'COT structure information' (abbrev. 'COT str. info.') specifies the 'COT structure' individually for each symbol of fixed time duration of one slot. This Table 3 shall, however, not be understood as limitation to the present disclosure, specifically since it does not provide an exhaustive list of COT structures.

TABLE 3

Exemplary 'COT structure information'

| COT str. info. | COT structure |
|---|---|
| 0 | DDDDDDDDDDDDDD |
| 1 | UUUUUUUUUUUUUU |
| 2 | FFFFFFFFFFFFFF |
| 3 | DDDDDDDDDDDDDF |
| 4 | DDDDDDDDDDDDFF |
| 5 | DDDDDDDDDDDFFF |
| 6 | DDDDDDDDDDDDFU |
| 7 | DDDDDDDDDDDFUU |
| 8 | DFUUUUUUUUUUUU |
| 9 | ... |
| ... | ... |

In this Table 3, the 'COT structure information' specifies uplink symbols ('U' in the Table 3), downlink symbols ('D' in the Table 3) or flexible symbols ('F' in the Table 3 above) for a fixed time duration of one slot, the one slot corresponding to the sequence of 14 symbols.

Another specific example of the 'COT structure information' is shown in below Table 4, namely where the 'COT structure information' specifies the 'COT structure' individually for each symbol of variable time duration of one or two slots. This Table 4 shall, however, not be understood as limitation to the present disclosure, specifically since it does not provide an exhaustive list of COT structures.

TABLE 4

Another Exemplary 'COT structure information'

| COT str. info. | COT structure |
|---|---|
| 0 | DDDDDDDDDDDDDD |
| 1 | DDDDDDDDDDDDFU |
| 2 | FFFFFFFFFFFFFF |
| 3 | DFUUUUUUUUUUUU |
| 4 | FFFFFFFFFFFFFF |
| 5 | DDDDDDDDDDDFFF |
| 6 | UUUUUUUUUUUUUU |
| 7 | DDDDDDDDDDDDDD |
|   | DDDDDDDDDDDDFU |
| 8 | DDDDDDDDDDDDDD |
|   | UUUUUUUUUUUUUU |
| 9 | DDDDDDDDDDDDDD |
|   | DFUUUUUUUUUUUU |
| 10 | DDDDDDDDDDDDFU |
|    | UUUUUUUUUUUUUU |
| 11 | ... |
| ... | ... |

In this Table 4, the 'COT structure information' specifies uplink symbols (abbrev. 'U' in Table), downlink symbols (abbrev. 'D' in Table) or flexible symbols (abbrev. 'F' in Table) for a variable time duration of one slot, the one slot corresponding to the sequence of 14 symbols, or of two slots, the two slots corresponding to the sequence of 28 symbols.

For the case that the 'COT structure information' specifies the 'COT structure' of two (consecutive) slots, an signaling overlap may occur in that two separately received 'COT structure information' may specify the 'COT structure' of one and the same slot. This overlap facilitates creating a degree of redundancy and further facilitates an increase in flexibility for the 'COT structure', namely one which includes slots which are only comprised of uplink symbols.

In more detail to the increase in flexibility for the 'COT structure': Assuming a case where the 'COT structure' is most flexibly specified and even includes slots which are only (entirely) comprised of uplink symbols, then it is mandatory to signal for such 'COT structure' a 'COT structure information' in form of the combined signaling of a 'COT structure' for at least two or more slots.

Let' consider, for sake of example, that a 'COT structure information' is specifying a 'COT structure' for a slot (e.g., slot #K) with only uplink symbols. Then, this 'COT structure information' cannot be received in the same slot (again slot #K) as this slot is specified by the 'COT structure' to only have uplink signals. In other words, for this 'COT structure' specifying a slot which only has uplink signals, it is necessary to signal the respective 'COT structure information' in a different, namely a preceding slot (e.g., slot #K−1).

Further to this example, let's consider that this 'COT structure information' is signaled in the preceding slot (e.g., slot #K−1), specifying a 'COT structure' with only uplink symbols for the subsequent slot (again slot #K). Then again, in this subsequent slot (again slot #K) no further 'COT structure information' can be signaled because this slot (again slot #K) is specified to have the 'COT structure' with only uplink symbols.

For this reason, provided the 'COT structure' is most flexibly defined and even includes slots which are only (entirely) comprised of uplink symbols, then it is mandatory to signal the respective 'COT structure information' in form of the combined signaling of a 'COT structure' for at least two or more slots.

In more detail to the created degree of redundancy:

Assuming a case where there exists a 'COT structure information' which combines the signaling of plural 'COT structures' for at least two or more (consecutive) slots. Then, this does not prevent or prohibit the signaling of corresponding 'COT structure information' in each of the two or more slots as long as the specified 'COT structure' permits such signaling. Rather, this signaling of corresponding 'COT structure information' in each of the two or more slots creates a degree of redundancy.

Let' consider, for sake of example, that in one slot (e.g., slot #K) a '(COT structure information' according to Table 4 is signaled. And this 'COT structure information' has value 7. In conformance with Table 4, the value 7 specifies the 'COT structure' for two slots, namely the 'COT structure' of 'DDDDDDDDDDDDDD DDDDDDDDDDDDFU.'

This example does not prevent or prohibit that in the subsequent (consecutive) slot (e.g., slot #K+1) a 'COT structure information' according to Table 4 is also signaled. Then, this 'COT structure information' has value 1. In conformance with Table 4, the value 1 specifies the 'COT structure' for one slots, namely the 'COT structure' of 'DDDDDDDDDDDDFU.'

In other words, a same 'COT structure' of 'DDDDDDDDDDDDDFU' is signaled for the (second) slot with 'COT structure information' which has value 7, as for the (first) slot with 'COT structure information' which has value 1. For this reason, this signaling of corresponding 'COT structure information' in each of the two or more slots creates a degree of redundancy.

Having received the parameter 'prach-ConfigurationIndex' which serves as an indication of the time duration of channel resource which are to be used for a physical random access channel, PRACH, transmission, and having received the 'COT structure information' which serves as a configuration for at least one symbol of an occupancy time of the respective unlicensed channel for uplink communication, the user equipment 910 proceeds with its operation.

Particularly, the user equipment 910 determines (see, e.g., step S04 of FIG. 14) whether or not the indicated time duration of channel resources which are to be used for the PRACH transmission are included within (or fit into) the at least one symbol configured for uplink communication. To further describe this determination operation reference is made to the example depicted in FIG. 15.

Figure 15:
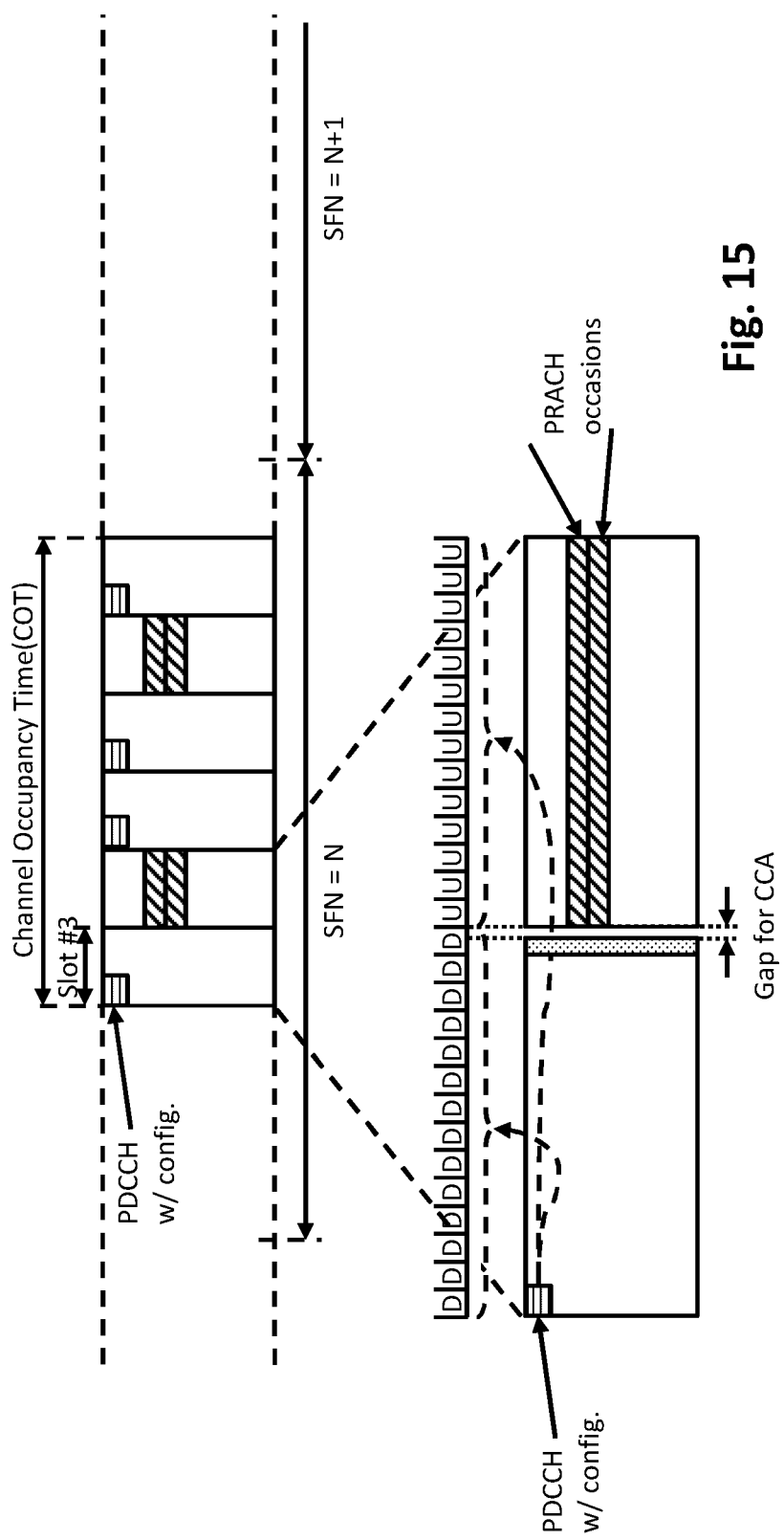
FIG. 15 shows an exemplary channel resource configuration of an occupancy time, where a UE performs the improved PRACH transmission operation according to the first exemplary implementation.

FIG. 15 shows an exemplary operation of the user equipment 910 according to the first exemplary implementation, namely where the user equipment 910 performs PRACH transmission over an unlicensed channel which is configured according to 'COT structure information' provided via PDCCH signaling.

As depicted in this figure, the user equipment 910 receives in slot #3 a PDCCH which carries a 'COT structure information' according to the above Table 4, which has value 7. The value 7 specifies the 'COT structure' for consecutive slots #3 and #4, namely the 'COT structure' of 'DDDDDDDDDDDDDD UUUUUUUUUUUUUU.' In this regard, slot #4 has a 'COT structure' with only uplink symbols.

At the same time, the received parameter 'prach-ConfigurationIndex' with value 22 according to Table 1 indicates to the user equipment that the time duration of the PRACH channel resources, is 14 symbols. Note that the user equipment ignores the starting symbol indicated via the parameter 'prach-ConfigurationIndex.'

Now, the user equipment 910 determines whether or not the indicated time duration of 14 symbols to be used as channel resources for the PRACH transmission can fit into the uplink symbols configured based on the 'COT structure information'. In other words, the user equipment 910 determines if the 'COT structure' has sufficiently high number of consecutive uplink symbols such that they can contain the time duration in terms of symbol numbers of PRACH channel resources.

As slot #4 has a 'COT structure' with 14 uplink symbols, the user equipment 910 determines that the indicated time duration (also 14 symbols) of the PRACH channel resources of slot #4 can be included within (can fit into) the symbols designated by the 'COT structure' as uplink symbols.

For this reason, in the depicted example, the user equipment 910 affirmatively determines slot #4 to resemble channel resources of the unlicensed channel which are to be used for PRACH transmission.

Due to the affirmative determination, the user equipment 910 proceeds to identify (see, e.g., step S05 of FIG. 14) the LBT category in line with which it shall behave when accessing the unlicensed channel. In the present case, the user equipment 910 receives an indication of one of plural gap durations in combination with an indication of one of plural LBT categories which is used therewith.

Such indication can be transmitted within the same PDCCH as that for 'COT structure information', or a separate PDCCH. In case the same PDCCH is used, it is also possible for gNB to use a different CRC scrambling RNTI (Radio Network Temporary Identifiers) to distinguish the purposes. If the same RNTI is used to scramble the PDCCH, then UE who received the PDCCH can decode both indications. On the other hand, if different RNTIs are used, then UE interested in only one indication can ignore the decoding of second indication.

The user equipment 910 may receive this indication in the PDCCH of slot #3 which is same as the PDCCH of also slot #3 in which the 'COT structure information' is carried as discussed with regard to FIG. 15. Alternatively, the user equipment 910 may have received this PDCCH of a previous slot.

Let's consider, for the sake of example, that the user equipment 910 receives an indication of value 2 which is to be interpreted in view of Table 2 discussed above. Then, the user equipment 910 knows that it has to use a gap duration of 25 µs when performing CCA and that it has to behave according to LBT Category 2. For this example, the user equipment 910 will know that it has found (e.g., received) a valid LBT category (see, e.g., step S06 of FIG. 14) and will proceed (case 'Y') with determining whether or not a PRACH is needed.

Let's consider, for the sake of another example, that the user equipment 910 receives an indication of value 4 which is to be interpreted in view of Table 2 discussed above. Then, the user equipment 910 cannot conclude on a valid LBT category (case 'N' of step S06 of FIG. 14). Then the user equipment 910 infers (see, e.g., step S07 of FIG. 14) that the affirmatively determined timing of the PRACH channel resources is invalid. No PRACH transmission is being performed for this invalid timing.

Referring back to the case that the user equipment has found a valid LBT category, then the user equipment 910 checks (see, e.g., step S08 of FIG. 14) if it has to perform a PRACH transmission. In case no PRACH transmission is to be performed (case 'N'), it recognizes that no further action (see, e.g., step S09 of FIG. 14) that no further action is to be taken.

In case a PRACH transmission is to be performed (case 'Y', it performs (see, e.g., step S10 of FIG. 14) a clear channel assessment, CCA. The clear channel assessment is performed for the indicated gap duration of 25 µs before the start of the timing of channel resources which are to be used for the PRACH transmission. In other words, the user equipment 910 performs the CCA before the start of slot #4.

Referring again to the exemplary operation of the user equipment 910 shown in FIG. 15, there the user equipment 910 actually performs the CCA before the start of the slot #4, namely before the start of a timing which is indicated by 'prach-ConfigurationIndex' with value 22 as channel resources for PRACH and which has been affirmatively determined to include uplink symbols as specified by the 'COT structure.'

Further, in case the CCA operation is affirmative (or successful), the user equipment 910 performs (see, e.g., step S10 of FIG. 14) the PRACH transmission via the channel resources by transmitting a random access, RA, preamble within the at least one symbol (i.e., slot #4) configured for uplink communication.

Figure 16:
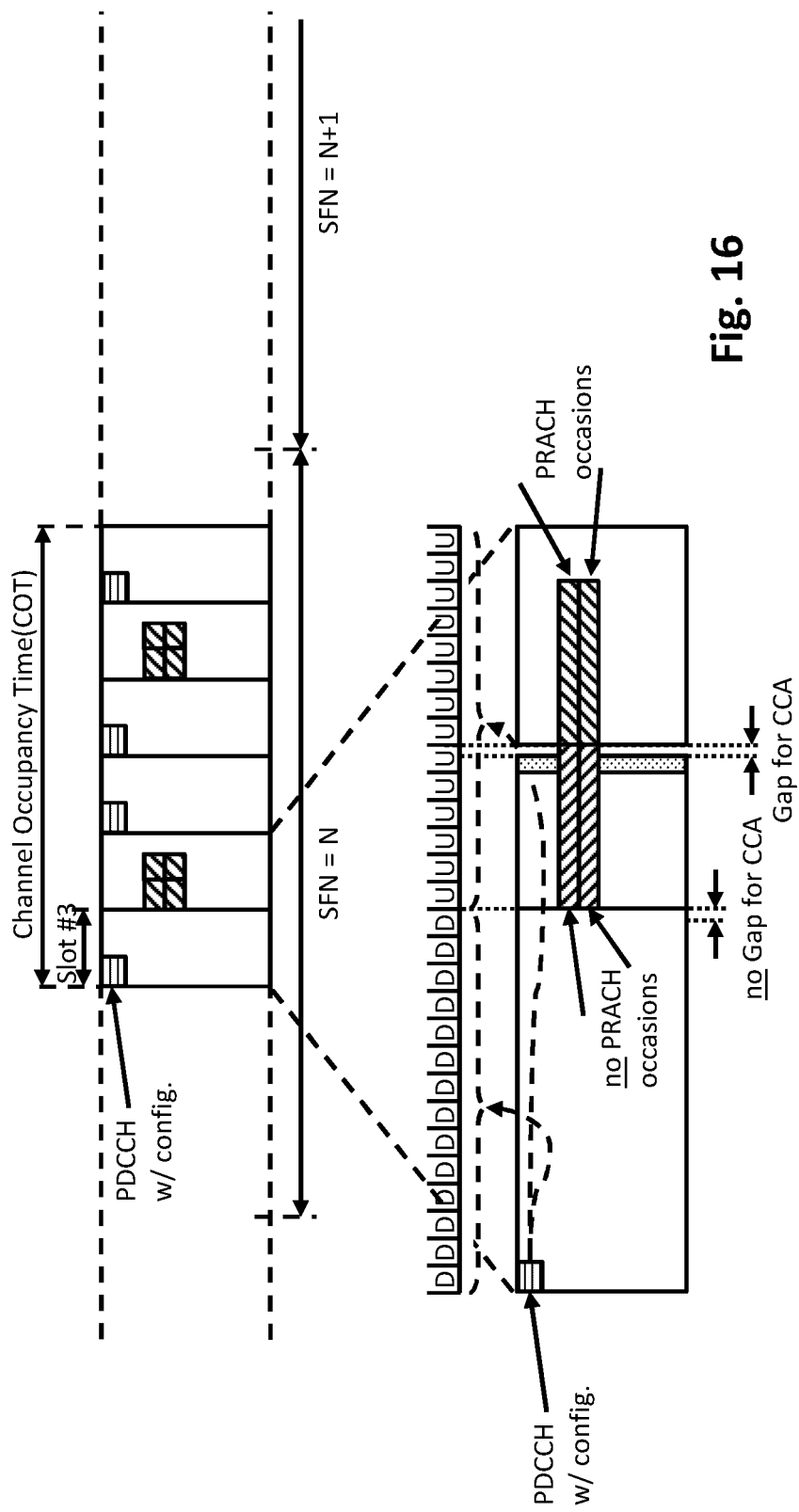
FIG. 16 shows another exemplary channel resource configuration of an occupancy time, where a UE performs the improved PRACH transmission operation according to the first exemplary implementation.

FIG. 16 shows another exemplary operation of the user equipment 910 according to the first exemplary implementation, namely where the user equipment 910 performs PRACH transmission over an unlicensed channel which is configured according to 'COT structure information' provided via PDCCH signaling.

This figure differs from what has been previously discussed in that the received parameter 'prach-Configuration-Index' indicates the duration of PRACH as 6 symbols instead of 14 symbols in FIG. 15.

Then the user equipment infers the starting symbol of PRACH according to two obtained pieces of information. The first information is the 'COT structure' indicating 14 UL symbols for slot #4, and the second information is the duration of PRACH. Starting from the first indicated UL symbol, the user equipment tries to fill in PRACH until the remaining of UL symbols cannot contain one PRACH. As a consequence, the indicated 14 UL symbols in slot #4 contains two PRACH time instances, starting from symbol #0 and symbol #6, respectively.

However, the scheduling node can have further control over the usage of the indicated UL symbols by manipulating the gap for CCA before each PRACH time instance. For example, if the gNB is not intended to receive any PRACH at the first PRACH time instance (spanning from symbol #0 to symbol #5), the scheduling node can indicate a non-gap for CCA (e.g., entry #4 in Table 2) for the first PRACH time instance. The user equipment, once receiving such information, knows that the first PRACH time instance is invalid and would refrain from sending PRACH. The scheduling node can use the first six UL symbols to schedule other UL transmission such as PUCCH or PUSCH without worrying about the collision caused by PRACH sent by (non-scheduled) UEs. On the other hand, if the scheduling node does expect to receive PRACH at the second PRACH time instance (from symbol #6 to symbol #11 in slot #4), it will indicate a valid CCA duration, such as 25 us, to the user equipment.

Then, the user equipment proceeds to performs the CCA before the start of the symbol #6 of slot #4, Since the second CCA operation is affirmative (or successful), the user equipment 910 he performs the PRACH transmission via these channel resources by transmitting a random access, RA, preamble within the at least one symbol (i.e., symbols #6 to #12 of slot #4) configured for uplink communication.

Second Exemplary Implementation

The second exemplary implementation also gives a more detailed description of the operation of user equipment 910 according to the generic scenario. In particular, this second exemplar implementation focuses on the determination whether an exact timing of previously configured (pre-configured) channel resources for PRACH (e.g., PRACH occasions) fits a dynamically signaled unlicensed channel access configuration.

Figure 17:
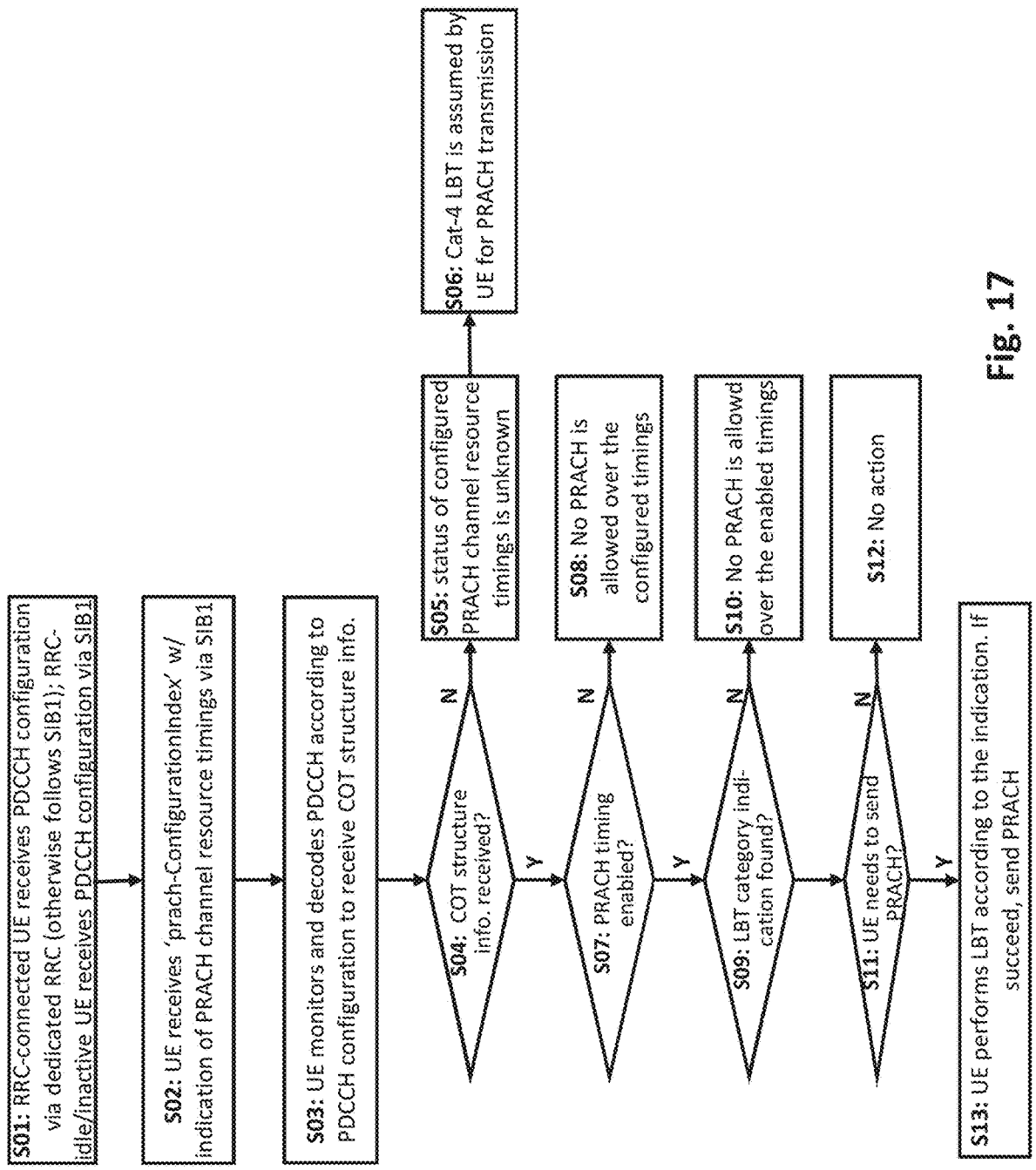
FIG. 17 illustrates a flow diagram for the behavior of a UE, according to a second exemplary implementation of an improved PRACH transmission operation.

In FIG. 17, a flow diagram according to the second exemplary implementation is shown. This flow diagram assumes a 5G NR deployment scenario and uses an according terminology. For example, reference is made not only to the physical random access channel, PRACH, in the uplink, but also to the physical downlink control channel, PDCCH, in the downlink. In this regard, the user equipment 910 is not only performing uplink, namely PRACH transmissions, but it is also performing downlink PDCCH receptions.

For this purpose, the user equipment 910 receives (see, e.g., step S01 of FIG. 17) a PDCCH configuration, which configures the user equipment 910 so that it is capable of receiving control information over the physical downlink control channel. With the PDCCH configuration, the user equipment 910 is configured to receive downlink control information (DCI) over PDCCH.

Two different starting points must be distinguished.

According to a first starting point, the user equipment 910 is in a 'RRC Connected' state. In this 'RRC Connected' state, the user equipment 910 is configured to receive dedicated control messages as specified by in RRC (Radio Resource Control) protocol. Then, the user equipment 910 receives the PDCCH configuration via a dedicated RRC control message.

This PDCCH configuration, being received via the dedicated RRC control message, is complementing various cell-specific configurations which are provided via SystemInformationBlockType1 (short: SIB1). The SIB1 is broadcasted to all user equipment(s) 910 served by the cell. In other words, for all complementing configurations which are not specified in the PDCCH configuration, the user equipment 910 follows SIB1.

According to a second starting point, the user equipment 910 is in a 'RRC Idle' or in a 'RRC Inactive' state. In both these states, the user equipment 910 is not configured to receive dedicated control messages as specified by RRC protocol. Nevertheless, the user equipment 910 is configured to receive cell-specific configurations which are provided via SystemInformationBlockType1 (short: SIB1). In this regard, the user equipment 910 receives the PDCCH configuration via the broadcasted SIB1.

Also, the user equipment 910 receives (see, e.g., step S02 of FIG. 17) via the same (or via a complementing) SIB1, the parameter 'prach-ConfigurationIndex.' This parameter serves as a timing indication indicating the exact timing (e.g., the start time and time duration) of channel resource which are to be used for a physical random access channel, PRACH, transmission. In other words, the timing indication permits the user equipment 910 to infer when, namely at what timings, channel resources are provided which are to be used for a PRACH transmission.

This parameter specifies time-domain related aspects for a physical random access channel, PRACH, transmission, such as the slot number or numbers of a radio frame which carry PRACH transmissions, a time duration of the PRACH transmission in number of symbols, a starting symbol of the PRACH transmission, the sequences to be used as RA preamble, etc. In this regard, the parameter 'prach-ConfigurationIndex' indicates a timing (e.g., the start time and time duration) of channel resources to be used by for the PRACH transmission.

Different from the first exemplary implementation, this second exemplary implementation is founded on the understanding that the parameter 'prach-ConfigurationIndex' prescribes the exact timing of channel resources which can subsequently be used for the PRACH transmission. Provided this timing of channel resources is determined to be in alignment with the dynamically indicated 'COI structure' the user equipment 910 will not deviate from such timing of channel resources which are pre-configured via RRC.

Assuming for the sake of example that the signaled parameter 'prach-ConfigurationIndex' has the value 22, then the user equipment 910 infers from the pre-configured Table 1 (discussed above) that exactly symbols #0 to #13 of slot #1, #4 and #7 are channel resources which are to be used for PRACH transmission. However, as described above, this timing indication of the channel resources for PRACH transmissions does not take account of whether or not the unlicensed channel is actually occupied.

In this regard, the user equipment 910 also receives (see, e.g., step S03 of FIG. 17) an unlicensed channel access configuration. In this second exemplary implementation, the unlicensed channel access configuration is again signaled in form of a channel occupancy time structure information, henceforth: 'COT structure information.' Based on the received 'COT structure information', the user equipment 910 configures at least one symbol of an occupancy time of the respective unlicensed channel for uplink communication.

In other words, the 'COT structure information' structures the channel occupancy time, namely that time during which the unlicensed channel is occupied for 5G NR operation. For example, if the unlicensed channel was shared between 5G NR operation and WiFi operation, then the occupancy time of the unlicensed channel exclusively refers to the time where this channel is occupied for 5G NR operation, namely where the user equipment 910 can validly expect to receive downlink communication and to be scheduled for uplink communication.

Such an exclusive 5G NR operation, however, does not mean that the user equipment 910 must not perform PRACH transmissions outside of the channel occupancy time (COT). To the contrary, the user equipment 910 in some situations (see for instance the description of FIG. 19) is prompted to perform PRACH transmissions outside of the COT. These PRACH merely differ in that, outside of the COT, interference with WiFi operation is not excluded.

In particular, in case no 'COT structure information' is received (see, e.g., step S04 of FIG. 17), the user equipment 910 infers that (see, e.g., step S05 of FIG. 17) the status of the configured PRACH channel resource is unknown. In other words, the user equipment 910 understands that at the timing of the configured PRACH channel resources the unlicensed channel is shared between 5G NR operation and WiFi operation.

In this regard, the user equipment 910 assumes (see, e.g., step S06 of FIG. 17) a behavior according to LBT Category 4 for the PRACH transmission. In other words, the user equipment 910 draws a random number N, and performs the CCA for the gap duration which varies based on the random number N. In case the CCA is affirmative, the user equipment 910 performs the PRACH transmission via these channel resources by transmitting a random access, RA, preamble at the configured PRACH time instance (starting symbol and duration) by 'prach-ConfigurationIndex.' If CCA does not pass, the PRACH transmission will be dropped.

Figure 19:
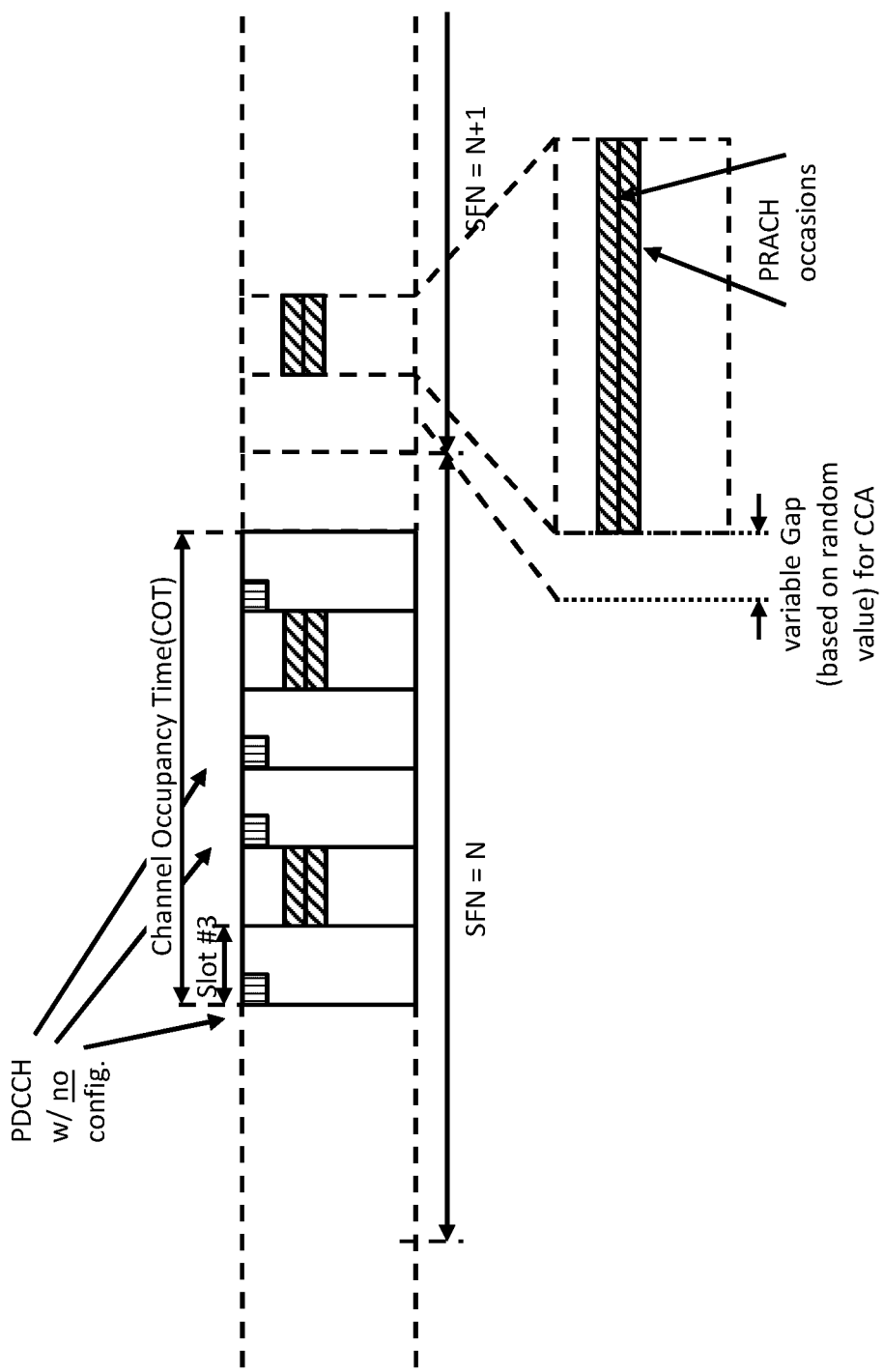
FIG. 19 shows another exemplary channel resource configuration of an occupancy time, where a UE performs the improved PRACH transmission operation according to the second exemplary implementation.

In FIG. 19, an exemplary operation of the user equipment 910 according to the second exemplary implementation is shown. Herein, the user equipment 910 performs a PRACH transmission outside of the channel occupancy time (COT) with a LBT category 4 behavior. Since the timing of the configured PRACH channel resources in slot #1 lies outside of COT, the user equipment 910 does not receive any 'COT structure information' for same slot. In other words, the user equipment 910 performs the PRACH transmission after a successful CCA with a variable gap duration that is based on a random value.

In more detail, the user equipment 910 receives the 'COT structure information' via the physical downlink control channel PDCCH, preferably in a respective field of a downlink control information, DCI format. For example, the 'COT structure information' can be transmitted via DCI-Format 2-0 on PDCCH. In more detail, the user equipment 910 monitors and decodes PDCCH according to the PDCCH configuration in order to receive the 'COT structure information.'

The received 'COT structure information' permits the user equipment 910 to configure at least one symbol of an occupancy time of the respective unlicensed channel for uplink communication.

However, different from the first exemplary implementation, in this second exemplary implementation, the 'COT structure information' corresponds to an indication which enables/disables previously configured (pre-configured) channel resources for PRACH (e.g., PRACH occasions) so that at their timings the PRACH transmission can/cannot be performed.

In other words, the 'COT structure information' conveys the information how the individual symbols of the channel occupancy time (COT) are being structured, i.e., when switching points between downlink and uplink (or vice-versa) occur. In more detail, the 'COT structure information' prescribes symbols of plural slots of the occupancy time to be one of an uplink, a downlink or a flexible symbols, the receiver, in operation, receives plural 'COT structure information' with partial overlap.

For specific example of the 'COT structure information', reference is made to Table 3 and 4 and the respective description above Having received the parameter 'prach-ConfigurationIndex' which serves as an indication of the exact timing (e.g., start time and the time duration) of channel resource which are to be used for a physical random access channel, PRACH, transmission, and having received the 'COT structure information' which serves as a configuration for at least one symbol of an occupancy time of the respective unlicensed channel for uplink communication, the user equipment 910 proceeds with its operation.

Particularly, the user equipment 910 determines (see, e.g., step S07 of FIG. 17) whether or not the indicated exact timing (e.g., start time and time duration) of channel resources which are to be used for the PRACH transmission are included within (or fit into) the at least one symbol configured for uplink communication. To further describe this determination operation reference is made to the example depicted in FIG. 18.

Figure 18:
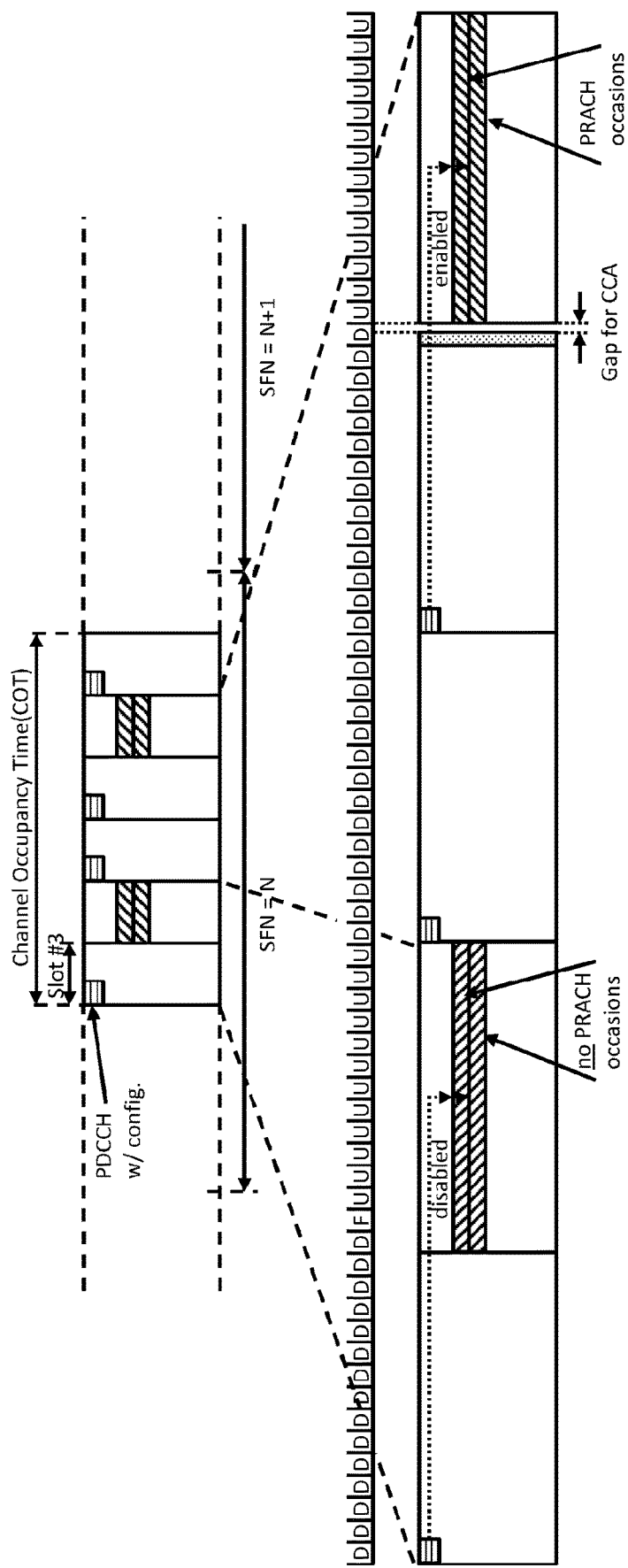
FIG. 18 shows an exemplary channel resource configuration of an occupancy time, where a UE performs the improved PRACH transmission operation according to the second exemplary implementation.

FIG. 18 shows an exemplary operation of the user equipment 910 according to the second exemplary implementation, namely where the user equipment 910 performs PRACH transmission over an unlicensed channel which is configured according to 'COT structure information' provided via PDCCH signaling.

As depicted in this figure, the user equipment 910 receives in slot #3 a PDCCH which carries a 'COT structure information' according to the above Table 4, which has value 9. The value 9 specifies the 'COT structure' for consecutive slots #3 and #4, namely the 'COT structure' of 'DDDDDDDDDDDDDD DFUUUUUUUUUUUU.' In this regard, slot #4 has a 'COT structure' with only 12 uplink symbols with symbol numbers #2 to #13.

At the same time, the received parameter 'prach-ConfigurationIndex' with value 22 according to Table 1 indicates to the user equipment that the start time of the PRACH channel resources is symbol number #0, and that the time duration of the PRACH channel resources is 14 symbols, extending from symbol number #0 to #13.

Now, the user equipment 910 determines whether or not the indicated (exact) timing of the PRACH channel resources is included within the uplink symbols configured based on the 'COT structure information.' In other words, the user equipment 910 determines if the 'COT structure' has uplink symbols at the exact timing of the PRACH channel resources in terms of starting time and time duration.

As slot #4 has a 'COT structure' with only 12 uplink symbols, and does not have an uplink symbol at the starting time of symbol number #0 or #1 as required by the received parameter 'prach-ConfigurationIndex', the user equipment 910 determines (see, e.g., step S07, case 'N' of FIG. 17) that the PRACH channel resources cannot be used. In other words, the (exact) timing of channel resources to be used for PRACH transmissions cannot be enabled.

In this regard, the user equipment 910 infers (see, e.g., step S08 of FIG. 17) that for the symbol configuration of the two consecutive slots #3 and #4 based on 'COT structure information' with value 9, no PRACH channel resources are allowed.

The situation is different for slot #7.

In slot #7, both the 'prach-ConfigurationIndex' parameter prescribe in total 14 uplink symbols at symbol numbers #0 to #13 and also the 'COT structure' result in the configuration of 14 uplink symbols at the same symbol numbers #0 to #13. Hence, the user equipment 910 determines (see, e.g., step S07, case 'Y' of FIG. 17) that the PRACH channel resources can be used. In other words, the (exact) timing of channel resources to be used for PRACH transmissions is enabled.

Due to the affirmative determination, the user equipment 910 proceeds to identify (see, e.g., step S09 of FIG. 17) the LBT category in line with which it shall behave when accessing the unlicensed channel. In the present case, the user equipment 910 receives an indication of one of plural gap durations in combination with an indication of one of plural LBT categories which is used therewith.

Such indication can be transmitted within the same PDCCH as that for 'COT structure information', or a separate PDCCH. In case the same PDCCH is used, it is also possible for gNB to use a different CRC scrambling RNTI (Radio Network Temporary Identifiers) to distinguish the purposes. If the same RNTI is used to scramble the PDCCH, then UE who received the PDCCH can decode both indications. On the other hand, if different RNTIs are used, then UE interested in only one indication can ignore the decoding of second indication.

In the example, the user equipment 910 may receive this indication in the PDCCH of slot #6 which is same as the PDCCH of also slot #6 in which the 'COT structure information' is carried as discussed with regard to FIG. 18. Alternatively, the user equipment 910 may have received this PDCCH of a previous slot.

Let's consider, for the sake of example, that the user equipment 910 receives an indication of value 2 which is to be interpreted in view of Table 2 discussed above. Then, the user equipment 910 knows that it has to use a gap duration of 25 µs when performing CCA and that it has to behave according to LBT Category 2. For this example, the user equipment 910 will know that it has found (e.g., received) a valid LBT category (see, e.g., step S11 of FIG. 17) and will proceed (case 'Y') with determining whether or not a PRACH is needed.

Let's consider, for the sake of another example, that the user equipment 910 does not receive (case 'N') any indication of the gap duration. Then, the user equipment 910 does not know how it can perform CCA before accessing the unlicensed channel. For this reason, the user equipment 910 infers (see, e.g., step S10 of FIG. 17) that no PRACH transmissions are allowed over the uplink symbols as configured in response to the provided 'COT structure information.'

Referring back to the case that the user equipment has found a valid LBT category, then the user equipment 910 checks (see, e.g., step S11 of FIG. 17) if it has to perform a PRACH transmission. In case no PRACH transmission is to be performed (case 'N'), it recognizes that no further action (see, e.g., step S12 of FIG. 17) that no further action is to be taken.

In case a PRACH transmission is to be performed (case 'Y', it performs (see, e.g., step S13 of FIG. 17) a clear channel assessment, CCA. The clear channel assessment is performed for the indicated gap duration of 25 µs before the start of the timing of channel resources which are to be used for the PRACH transmission. In other words, the user equipment 910 performs the CCA before the start of slot #7.

Referring again to the exemplary operation of the user equipment 910 shown in FIG. 18, there the user equipment 910 actually performs the CCA before the start of the slot #7, namely before the start of a timing which is indicated by 'prach-ConfigurationIndex' with value 22 as channel resources for PRACH and which has been affirmatively determined to include uplink symbols as specified by the 'COT structure.' Note that to facilitate the CCA, gNB has to create the gap by, e.g., not transmitting any signal at the part of the last symbol of previous slot, slot #6.

Further, in case the CCA operation is affirmative (or successful), the user equipment 910 performs (see, e.g., step S13 of FIG. 17) the PRACH transmission via the channel resources by transmitting a random access, RA, preamble within the at least one symbol (i.e., slot #7) configured for uplink communication.

Further Aspects

According to a first aspect, a user equipment, UE, is provided comprising a processor, a receiver and a transmitter. The processor, in operation, configures, based on a received unlicensed channel access configuration, at least one symbol of an occupancy time of the respective unlicensed channel for uplink communication. The receiver, in operation, receives an indication of a timing of channel resources which are to be used for a physical random access channel, PRACH, transmission. The processor, in operation, determines whether or not the indicated timing of channel resources which are to be used for the PRACH transmission is included within the at least one symbol configured for uplink communication. The processor, in operation and in case the determination is affirmative, performs a clear channel assessment, CCA, for a gap duration before the start of the indicated timing of channel resources which are to be used for the PRACH transmission. And, the transmitter, in operation and in case the CCA is affirmative, performs the PRACH transmission by transmitting a random access, RA, preamble within the at least one symbol configured for uplink communication at the indicated timing of channel resources which are to be used for the PRACH transmission.

According to a second aspect, which is provided in addition to the first aspect, the receiver, in operation, further receives an indication of the gap duration for performing the clear channel assessment, CCA, before performing the PRACH transmission.

According to a third aspect, which is provided in addition to the first aspect, the processor, in operation, draws a random number N, and performs the CCA for the gap duration which varies based on the random number N, in case the receiver, in operation, does not receive the indication of the gap duration.

According to a fourth aspect, which is provided in addition to the first or second aspect, the indication of the gap duration is one of: an indication of one of plural gap durations, an indication of one of plural listen-before-talk, LBT, categories which is only used with a single gap duration, and an indication of one of plural gap durations in combination with an indication of one of plural LBT categories which is used therewith.

According to a fifth aspect, which is provided in addition to the fourth aspect, the gap duration is one of: 16 µs and 25 µs, and the LBT category is one of: LBT category 1, LBT category 2, LBT category 3 and LBT category 4.

According to a sixth aspect, which is provided in addition to the first or second aspect, the indication of the gap duration is an indication that no PRACH transmissions are to be performed.

According to a seventh aspect, which is provided in addition to the first to sixth aspect, the receiver, in operation, further receives the unlicensed channel access configuration in form of one of: semi-static signaling, which is to configure the occupancy time from the time instance and for the duration the unlicensed channel is occupied, and dynamic signaling which is to configure at least parts of the occupancy time relative to when the signaling is received;

According to an eighth aspect, which is provided in addition to the first to seventh aspect, the processor, in operation, infers the indicated timing of the channel resources from one of: semi-static signaling which indicates the timing in form of a start time and/or a time duration of channel resources, dynamic signaling which indicates the timing in form of an enable/disable information for at least some previously configured channel resources, dynamic signaling which indicates the timing in form of a start time and/or a time duration for at least some channel resources.

According to a ninth aspect, which is provided in addition to the eighth aspect, in case the processor infers the indicated timing from semi-static signaling, the indicated timing of the channel resources is pre-configured for the occupancy time of the unlicensed channel.

According to a tenth aspect, which is provided in addition to the eighth aspect, in case the processor infers the indicated timing from dynamic signaling, the at least some previously configured channel resources which are to be enabled/disabled are relative to when the signaling is received.

According to an eleventh aspect, which is provided in addition to the eighth aspect, in case the processor infers the indicated timing from dynamic signaling, the indicated timing of channel resources is for parts of the occupancy time of the unlicensed channel relative to when the signaling is received.

According to a twelfth aspect, which is provided in addition to the seventh to eleventh aspect, the semi-static signaling is radio resource control, RRC, signaling, preferably including at least one broadcast system information, SI, block or message or a dedicated RRC message with an Information Element carrying the respective configuration and/or indication;

According to a thirteenth aspect, which is provided in addition to the seventh to eleventh aspect the dynamic signaling is one of: media access control, MAC, signaling, preferably including at least one MAC control element, MAC CE, carrying the respective configuration and/or indication, and physical, PHY, signaling, preferably including at least one downlink control information, DCI, carrying the respective configuration and/or indication.

According to a fourteenth aspect, which is provided in addition to the first to thirteenth aspect the transmitter, in operation and in case the CCA is negative, does not perform the PRACH transmission via the channel resources.

According to a fifteenth aspect, which is provided in addition to the first to fourteenth aspect, the receiver, in operation, receives the indication of the timing of channel resources which are to be used for the PRACH transmission in form of a channel occupancy time, COT, structure information, and/or the COT structure information prescribes the symbols of at least one slot of the occupancy time to be one of an uplink, a downlink or a flexible symbols which are respectively configured by the processor for uplink or downlink communication, and/or in case the COT structure information prescribes symbols of plural slots of the occupancy time to be one of an uplink, a downlink or a flexible symbols, the receiver, in operation, receives plural COT structure information with partial overlap relative for the occupancy time of the unlicensed channel for uplink communication.

According to a sixteenth aspect, a method is provided comprising the following steps performed by a user equipment, UE: configuring, based on a received unlicensed channel access configuration, at least one symbol of an occupancy time of the respective unlicensed channel for uplink communication; receiving an indication of a timing of channel resources which are to be used for a physical random access channel, PRACH, transmission; determining whether or not the indicated timing of channel resources which are to be used for the PRACH transmission is included within the at least one symbol configured for uplink communication; in case the determination is affirmative, performing a clear channel assessment, CCA, for a gap duration before the start of the indicated timing of channel resources which are to be used for the PRACH transmission; and in case the CCA is affirmative, performing the PRACH transmission by transmitting a random access, RA, preamble within the at least one symbol configured for uplink communication at the indicated timing of channel resources which are to be used for the PRACH transmission.

According to a seventeenth aspect, a base station, BS, is provided comprising a processor, a transmitter, and a receiver. The processor, in operation, configures, based on an unlicensed channel access configuration, at least one symbol of an occupancy time of the respective unlicensed channel for uplink communication. The transmitter, in operation, transmits an indication of a timing of channel resources which are to be used for a physical random access channel, PRACH, transmission. The processor, in operation, determines whether or not the indicated timing of channel resources which are to be used for the PRACH transmission is included within the at least one symbol configured for uplink communication. The processor, in operation and in case the determination is affirmative, identifies whether or not a transmission gap is configured with a gap duration before the start of the indicated timing of channel resources which are to be used for the PRACH transmission. The receiver, in operation and in case the identification of the transmission gap is affirmative, receives the PRACH transmission in form of a random access, RA, preamble transmitted within the at least one symbol configured for uplink communication at the indicated timing of channel resources which are to be used for the PRACH transmission.

According to an eighteenth aspect, a method is provided comprising the following steps performed by a base station, BS: configuring, based on an unlicensed channel access configuration, at least one symbol of an occupancy time of the unlicensed channel for uplink communication; transmitting an indication of a timing of channel resources which are to be used for a physical random access channel, PRACH, transmission; determining whether or not the indicated timing of channel resources which are to be used for the PRACH transmission is included within the at least one symbol configured for uplink communication; in case the determination is affirmative, identifying whether or not a transmission gap is configured with a gap duration before the start of the indicated timing of channel resources which are to be used for the PRACH transmission; and in case the identification of the transmission gap is affirmative, receiving the PRACH transmission in form of a random access, RA, preamble transmitted within the at least one symbol configured for uplink communication at the indicated timing of channel resources which are to be used for the PRACH transmission.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs.

The LSI may be individually formed as chips, or one chip may be formed so as to include a part or all of the functional blocks. The LSI may include a data input and output coupled thereto.

The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used.

The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)." The communication may include exchanging data through, for example, a cellular system, a wireless LAN system, a satellite system, etc., and various combinations thereof.

The communication apparatus may comprise a device such as a controller or a sensor, which is coupled to a communication device performing a function of communication described in the present disclosure. For example, the communication apparatus may comprise a controller or a sensor that generates control signals or data signals, which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment (UE) comprising:
a processor, which in operation, configures, based on a received unlicensed channel access configuration, at least one symbol of an occupancy time of the unlicensed channel for uplink communication;
a receiver, which in operation, receives an indication of a timing of channel resources which are to be used for a physical random access channel (PRACH) transmission, and receives an indication of a gap duration;
the processor, in operation, determines whether or not the indicated timing of channel resources which are to be used for the PRACH transmission is included within the at least one symbol configured for uplink communication;
the processor, in operation and in case the determination is affirmative, performs a clear channel assessment (CCA) for the gap duration before the start of the indicated timing of channel resources which are to be used for the PRACH transmission; and a transmitter, which in operation and in case the CCA is affirmative, performs the PRACH transmission by transmitting a random access (RA) preamble within the at least one symbol configured for uplink communication at the indicated timing of channel resources which are to be used for the PRACH transmission, wherein the indication of the gap duration is an indication of one of plural gap durations in combination with an indication of one of plural listen-before-talk (LBT) categories, including a first indication which indicates 16 μs in combination with LBT category 1, and a second indication which indicates 16 μs in combination with LBT category 2.

2. The UE according to claim 1, wherein in case the receiver, in operation, does not receive the indication of the gap duration, the processor, in operation, draws a random number N, and performs the CCA for the gap duration which varies based on the random number N.

3. The UE according to claim 1, wherein the plural gap durations include 16 μs and 25 μs, and the plural LBT categories include LBT category 1, LBT category 2, LBT category 3 and LBT category 4.

4. The UE according to claim 1, wherein the indication of the gap duration is an indication that no PRACH transmissions are to be performed.

5. The UE according to claim 1, wherein:
the receiver, in operation, receives the unlicensed channel access configuration in form of one of:
semi-static signaling which is to configure the occupancy time from a time instance and for a duration the unlicensed channel is occupied, and
dynamic signaling which is to configure at least parts of the occupancy time relative to when the dynamic signaling is received.

6. The UE according to claim 5, wherein,
the semi-static signaling is radio resource control (RRC) signaling, including at least one broadcast system information (SI) block or message or a dedicated RRC message with an Information Element carrying the respective configuration and/or indication;
and/or
the dynamic signaling is one of:
media access control (MAC) signaling, including at least one MAC control element (MAC CE) carrying the respective configuration and/or indication, and
physical (PHY) signaling, including at least one downlink control information (DCI) carrying the respective configuration and/or indication.

7. The UE according to claim 1, wherein:
the processor, in operation, infers the indicated timing of the channel resources from one of:
semi-static signaling which indicates the timing in form of a start time and/or a time duration of channel resources,
dynamic signaling which indicates the timing in form of an enable/disable information for at least some previously configured channel resources,
dynamic signaling which indicates the timing in form of a start time and/or a time duration for at least some channel resources.

8. The UE according to claim 7, wherein,
in case the processor infers the indicated timing from semi-static signaling, the indicated timing of the channel resources is pre-configured for the occupancy time of the unlicensed channel;

and/or
in case the processor infers the indicated timing from dynamic signaling, the at least some previously configured channel resources which are to be enabled/disabled are relative to when the signaling is received;
and/or
in case the processor infers the indicated timing from dynamic signaling, the indicated timing of channel resources is for parts of the occupancy time of the unlicensed channel relative to when the signaling is received.

9. The UE according to claim 1, wherein the transmitter, in operation and in case the CCA is negative, does not perform the PRACH transmission via the channel resources.

10. The UE according to claim 1, wherein,
the receiver, in operation, receives the indication of the timing of channel resources which are to be used for the PRACH transmission in form of a channel occupancy time (COT) structure information,
and/or
the COT structure information prescribes the symbols of at least one slot of the occupancy time to be one of an uplink, a downlink or a flexible symbols which are respectively configured by the processor for uplink or downlink communication,
and/or
in case the COT structure information prescribes symbols of plural slots of the occupancy time to be one of an uplink, a downlink or a flexible symbols, the receiver, in operation, receives plural COT structure information with partial overlap relative for the occupancy time of the unlicensed channel for uplink communication.

11. A method comprising the following steps performed by a user equipment (UE):
configuring, based on a received unlicensed channel access configuration, at least one symbol of an occupancy time of the unlicensed channel for uplink communication;
receiving an indication of a timing of channel resources which are to be used for a physical random access channel (PRACH) transmission;
receiving an indication of a gap duration;
determining whether or not the indicated timing of channel resources which are to be used for the PRACH transmission is included within the at least one symbol configured for uplink communication;
in case the determination is affirmative, performing a clear channel assessment (CCA) for the gap duration before the start of the indicated timing of channel resources which are to be used for the PRACH transmission; and
in case the CCA is affirmative, performing the PRACH transmission by transmitting a random access (RA) preamble within the at least one symbol configured for uplink communication at the indicated timing of channel resources which are to be used for the PRACH transmission,
wherein the indication of the gap duration is an indication of one of plural gap durations in combination with an indication of one of plural listen-before-talk (LBT) categories, including a first indication which indicates 16 μs in combination with LBT category 1, and a second indication which indicates 16 μs in combination with LBT category 2.

12. A base station (BS) comprising:
a processor, which in operation, configures, based on an unlicensed channel access configuration, at least one symbol of an occupancy time of the unlicensed channel for uplink communication;

a transmitter, which in operation, transmits an indication of a timing of channel resources which are to be used for a physical random access channel (PRACH) transmission, and transmits an indication of a gap duration;

the processor, in operation, determines whether or not the indicated timing of channel resources which are to be used for the PRACH transmission is included within the at least one symbol configured for uplink communication;

the processor, in operation and in case the determination is affirmative, identifies whether or not a transmission gap is configured with the gap duration before the start of the indicated timing of channel resources which are to be used for the PRACH transmission; and a receiver, which in operation and in case the identification of the transmission gap is affirmative, receives the PRACH transmission in form of a random access (RA) preamble transmitted within the at least one symbol configured for uplink communication at the indicated timing of channel resources which are to be used for the PRACH transmission, wherein the indication of the gap duration is an indication of one of plural gap durations in combination with an indication of one of plural listen-before-talk (LBT) categories, including a first indication which indicates 16 µs in combination with LBT category 1, and a second indication which indicates 16 µs in combination with LBT category 2.

* * * * *